United States Patent
Duan et al.

(10) Patent No.: US 11,038,666 B1
(45) Date of Patent: Jun. 15, 2021

(54) OPEN-LOOP, SUPER FAST, HALF-RATE CLOCK AND DATA RECOVERY FOR NEXT GENERATION C-PHY INTERFACES

(71) Applicant: QUALCOMM Incorporated, San Diego, CA (US)

(72) Inventors: Ying Duan, San Diego, CA (US); Abhay Dixit, San Diego, CA (US); Shih-Wei Chou, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/711,230

(22) Filed: Dec. 11, 2019

(51) Int. Cl.
*H04L 7/033* (2006.01)
*H04L 7/00* (2006.01)

(52) U.S. Cl.
CPC ............ *H04L 7/033* (2013.01); *H04L 7/0037* (2013.01)

(58) Field of Classification Search
CPC . G06F 13/4295; G06F 13/4278; H04L 7/033; H04L 7/04; H04L 7/0008; H04L 25/493; H04L 7/0041; G09G 5/008
See application file for complete search history.

(56) References Cited

U.S. PATENT DOCUMENTS

| | | | |
|---|---|---|---|
| 9,485,080 B1 | 11/2016 | Duan et al. | |
| 9,496,879 B1 | 11/2016 | Duan et al. | |
| 9,531,572 B1* | 12/2016 | Shim | H04L 7/0012 |
| 9,735,950 B1* | 8/2017 | Liu | H04L 7/0331 |
| 10,263,766 B1 | 4/2019 | Wiley et al. | |
| 10,284,360 B2 | 5/2019 | Choi et al. | |
| 10,298,381 B1* | 5/2019 | Lee | H04L 7/0334 |
| 2016/0330048 A1* | 11/2016 | Tseng | H04L 65/607 |
| 2018/0062883 A1* | 3/2018 | Duan | H04L 7/0008 |
| 2018/0152282 A1* | 5/2018 | Choi | H03L 7/0807 |
| 2018/0159552 A1* | 6/2018 | Kim | H03K 19/17744 |

OTHER PUBLICATIONS

International Search Report and Written Opinion—PCT/US2020/057687—ISA/EPO—dated Feb. 4, 2021.

* cited by examiner

*Primary Examiner* — Khanh C Tran
(74) *Attorney, Agent, or Firm* — Chui-Kiu T. Wong

(57) ABSTRACT

Methods, apparatus, and systems for communication over a multi-wire, multiphase interface are disclosed. A clock recovery apparatus has a plurality of pulse generating circuits, a logic circuit and a delay flipflop. Each pulse generating circuit generates transition pulses in response to transitions in one of three difference signals representative of a difference in signaling state of a pair of wires in a three-wire bus. Transitions in the difference signals can occur at boundaries between sequentially-transmitted symbols. The first logic circuit may provide a single pulse in a combination signal at each boundary between pairs of symbols by combining one or more transition pulses. The delay flipflop is configured to respond to each pulse in the combination signal by changing signaling state of a clock signal that is output by the clock recovery apparatus. The symbols may be sequentially transmitted over the three-wire bus in accordance with a C-PHY protocol.

27 Claims, 22 Drawing Sheets

FIG. 4

OPEN-LOOP, SUPER FAST, HALF-RATE CLOCK AND DATA RECOVERY FOR NEXT GENERATION C-PHY INTERFACES

TECHNICAL FIELD

The present disclosure relates generally to high-speed data communication interfaces, and more particularly, to clock generation in a receiver coupled to a multi-wire, multi-phase data communication link.

BACKGROUND

Manufacturers of mobile devices, such as cellular phones, may obtain components of the mobile devices from various sources, including different manufacturers. For example, an application processor in a cellular phone may be obtained from a first manufacturer, while an imaging device or camera may be obtained from a second manufacturer, and a display may be obtained from a third manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by the Mobile Industry Processor Interface (MIPI) Alliance.

The C-PHY interface is a multiphase three-wire interface defined by the MIPI Alliance that uses a trio of conductors to transmit information between devices. Each wire in the trio may be in one of three signaling states during transmission of a symbol. Clock information is encoded in the sequence of transmitted symbols and a receiver generates a clock signal from transitions between consecutive symbols. The ability of a clock and data recovery (CDR) circuit to recover clock information may be limited by the maximum time variation related to transitions of signals transmitted on the different wires of the communication link. The CDR circuit in a C-PHY receiver may employ a feedback loop to control circuits that generate pulses in a receive clock signal. The feedback loop may be used to ensure that pulse generating circuits do not generate additional pulses triggered by transients that can occur before the conductors in the trio have assumed a stable signaling state before providing a sampling edge. Maximum symbol transmission rate may be limited by the feedback loop, and there is an ongoing need for optimized clock generation circuits that can function reliably at ever-higher signaling frequencies.

SUMMARY

Embodiments disclosed herein provide systems, methods and apparatus that enable improved communication on a multi-wire and/or multiphase communication link. The communication link may be deployed in apparatus such as a mobile terminal having multiple Integrated Circuit (IC) devices.

In various aspects of the disclosure, a clock recovery apparatus has a plurality of pulse generating circuits, a first logic circuit and a delay flipflop. Each pulse generating circuit may be configured to generate a transition pulse in response to a transition in one of three difference signals representative of a difference in signaling state of a pair of wires in a three-wire bus. Transitions in one or more difference signals can occur at boundaries between symbols that are sequentially transmitted over the three-wire bus. The first logic circuit may be configured to provide a single pulse in a combination signal at each boundary between pairs of sequentially-transmitted symbols by combining one or more transition pulses received from the plurality of pulse generating circuits. The delay flipflop may be configured to respond to each pulse in the combination signal by changing signaling state of a clock signal that is output by the clock recovery apparatus. The symbols may be sequentially transmitted over the three-wire bus in accordance with a C-PHY protocol.

In certain aspects, each pulse generating circuit includes a delay circuit configured to provide a delayed difference signal by delaying one of three difference signals, and a second logic circuit configured to provide the transition pulse by performing an exclusive OR function on the one of three difference signals and the delayed difference signal. The delay circuit may be configured to provide a delay that exceeds a duration of a skew between two of the three difference signals. The delay circuit may be configurable to provide a delay that accommodates variations in manufacturing process, circuit supply voltage, and die temperature conditions. The transition pulse may have a configurable duration. The delay flipflop may receive an inverse of the clock signal as its input. A rising edge in the clock signal may be used to capture a first symbol from the three-wire bus and a rising edge in the inverse of the clock signal is used to capture a second symbol from the three-wire bus. A falling edge in the clock signal may be used to capture a first symbol from the three-wire bus and a falling edge in the inverse of the clock signal is used to capture a second symbol from the three-wire bus. A rising edge in the clock signal may be used to capture a first symbol from the three-wire bus and a falling edge in the clock signal is used to capture a second symbol from the three-wire bus.

In various aspects of the disclosure, a clock recovery method includes generating a transition pulse in response to a transition in one of three difference signals representative of a difference in signaling state of a pair of wires in a three-wire bus, providing a single pulse in a combination signal at each boundary between pairs of sequentially-transmitted symbols by combining one or more transition pulses generated at the each boundary between the pairs of sequentially-transmitted symbols, and clocking a delay flipflop with the combination signal such that signaling state of a clock signal is changed in response to each pulse in the combination signal. Transitions in one or more difference signals can occur at boundaries between symbols that are sequentially transmitted over the three-wire bus.

In various aspects of the disclosure, a processor-readable storage medium has one or more instructions which, when executed by at least one processor of a processing circuit in a receiver, cause the at least one processor to generate a transition pulse in response to a transition in one of three difference signals representative of a difference in signaling state of a pair of wires in a three-wire bus, provide a single pulse in a combination signal at each boundary between pairs of sequentially-transmitted symbols by combining one or more transition pulses generated at the each boundary between the pairs of sequentially-transmitted symbols, and clock a delay flipflop with the combination signal such that signaling state of a clock signal is changed in response to each pulse in the combination signal. Transitions in one or more difference signals can occur at boundaries between symbols that are sequentially transmitted over the three-wire bus.

In various aspects of the disclosure, a clock recovery apparatus includes means for generating a transition pulse in response to a transition in one of three difference signals representative of a difference in signaling state of a pair of wires in a three-wire bus, means for providing a single pulse in a combination signal at each boundary between pairs of sequentially-transmitted symbols by combining one or more transition pulses received from the means for generating the transition pulse, and means for providing a clock signal that is output by the clock recovery apparatus. The means for providing a clock signal may include a delay flipflop configured to respond to each pulse in the combination signal by changing signaling state of the clock signal. Transitions in one or more difference signals can occur at boundaries between symbols that are sequentially transmitted over the three-wire bus.

BRIEF DESCRIPTION OF THE DRAWINGS

FIG. 4 illustrates signaling in a C-PHY 3-phase encoded interface.

DETAILED DESCRIPTION

Figure 1:
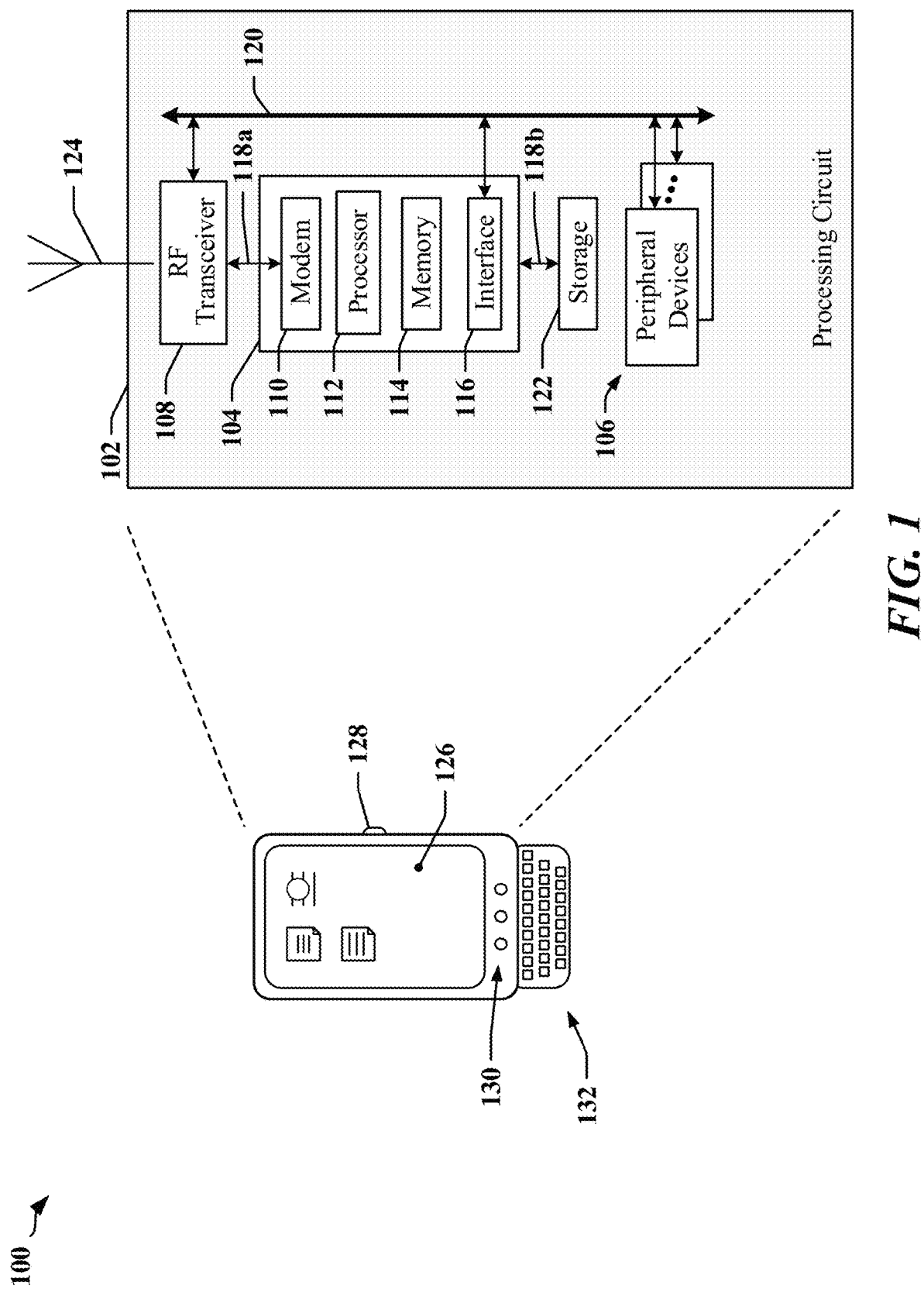
FIG. 1 depicts an apparatus employing a data link between IC devices that is selectively operated according to one of a plurality of available standards or protocols, which may include a C-PHY protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smartwatch, a health or fitness tracker, eyewear, etc.), an appliance, a sensor, a security device, a vending machine, a smart meter, a drone, a multicopter, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted over a set of three wires, which may be referred to as a trio, or trio of wires. For each symbol transmission interval, a three-phase signal is transmitted in different phases on the wires of the trio, where the phase of the three-phase signal on each wire is defined by a symbol transmitted in the symbol transmission interval. Each trio provides a lane on a communication link. A symbol transmission interval may be defined as the interval of time in which a single symbol controls the signaling state of a trio. In each symbol transmission interval, one wire of the trio is undriven, while the remaining two wires are differentially driven such that one of the two differentially driven wires assumes a first voltage level and the other differentially driven wire assumes to a second voltage level different from the first voltage level. The undriven wire may float, be driven, and/or be terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +½V. Different symbols are transmitted in each consecutively transmitted pair of symbols, and different pairs of wires may be differentially driven in different symbol intervals.

Certain aspects disclosed herein provide a clock recovery circuit in a C-PHY receiver circuit using an open-loop half-rate clock recovery circuit to enable symbol capture and decoding at next-generation C-PHY clock rates. In one example, a clock recovery method includes generating a transition pulse in response to a transition in one of three difference signals representative of a difference in signaling state of a pair of wires in a three-wire bus, providing a single pulse in a combination signal at each boundary between pairs of sequentially-transmitted symbols by combining one or more transition pulses generated at the each boundary between the pairs of sequentially-transmitted symbols, and clocking a delay flipflop with the combination signal such that signaling state of a clock signal is changed in response to each pulse in the combination signal. Transitions in one or more difference signals can occur at boundaries between symbols that are sequentially transmitted over the three-wire bus.

Example of an Apparatus Employing a C-PHY Interface

FIG. 1 depicts an example of apparatus 100 that may be adapted in accordance with certain aspects disclosed herein. The apparatus 100 may employ C-PHY 3-phase protocols to implement one or more communication links. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processor 112 provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or processor-readable storage 122 provided on the processing circuit 102. The software modules may include instructions and data stored in the on-board memory 114 or other processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
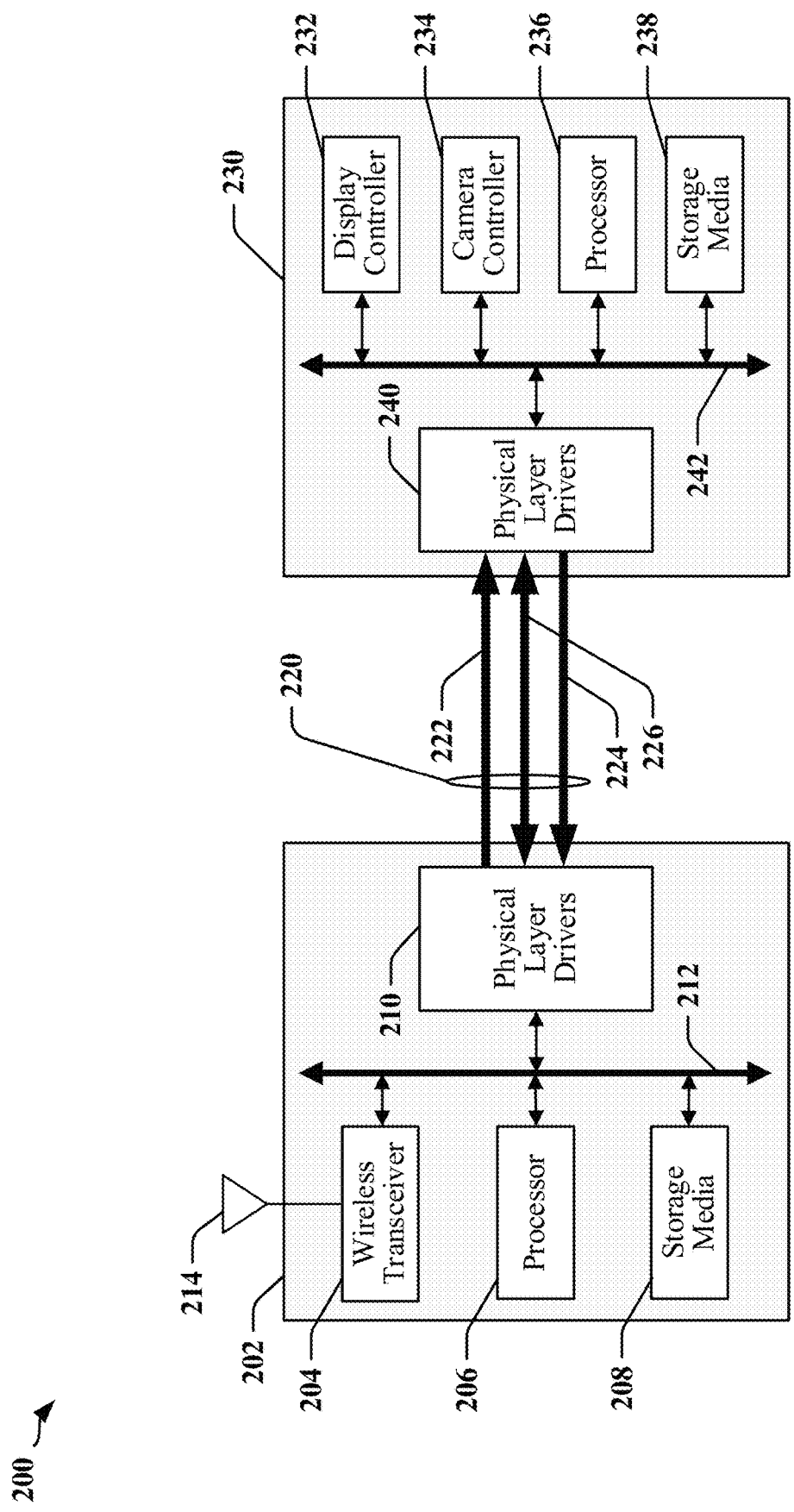
FIG. 2 illustrates a system architecture for an apparatus employing a data link between IC devices that selectively operates according to one of plurality of available standards.

FIG. 2 illustrates certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first channel 222 may be referred to as a forward channel 222 while a second channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor 206, 236, controller or other processing and/or computing circuit or device. In one example, the first IC device 202 may perform core functions of the apparatus 200, including establishing and maintaining wireless communication through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal buses 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate, symbol transmission rate and/or clocking rates. The forward and reverse data rates may be substantially the same or may differ by orders of magnitude, depending on the application. In some applications, a single bidirectional channel 226 may support communication between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

The physical layer drivers 210 and 240 can typically encode multiple bits per transition on the communication link 220 when configured for N-phase polarity encoding. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
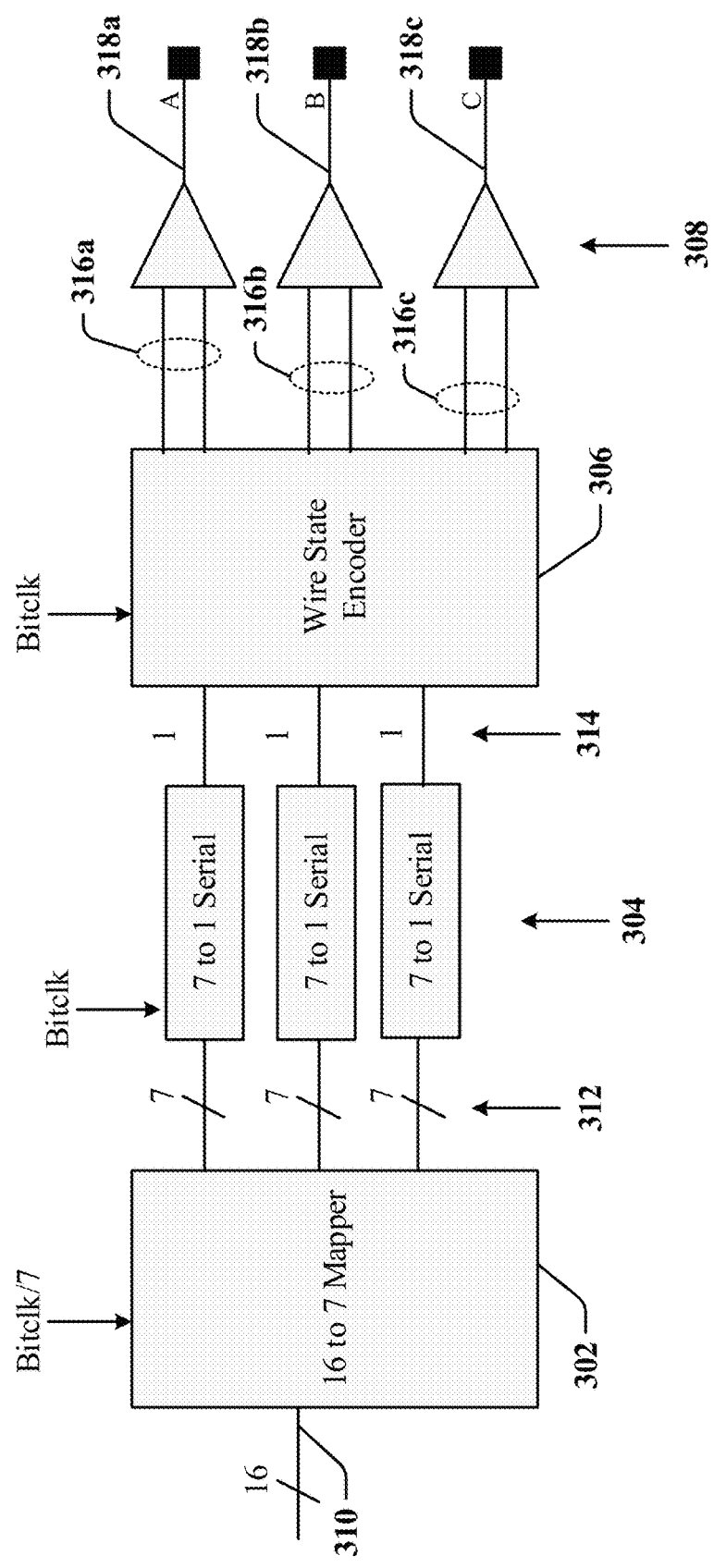
FIG. 3 illustrates a C-PHY 3-phase transmitter.

FIG. 3 is a diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 318a, 318b and/or 318c, and/or by driving a current through two of the signal wires 318a, 318b and/or 318c connected in series such that the current flows in different directions in the two signal wires 318a, 318b and/or 318c. The undriven state may be realized by placing an output of a driver of a signal wire 318a, 318b or 318c in a high-impedance mode. Alternatively, or additionally, an undriven state may be obtained on a signal wire 318a, 318b or 318c by passively or actively causing an "undriven" signal wire 318a, 318b or 318c to attain a voltage level that lies substantially halfway between positive and negative voltage levels provided on driven signal wires 318a, 318b and/or 318c. Typically, there is no significant current flow through an undriven signal wire 318a, 318b or 318c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 318a, 318b and 318c. The line drivers 308 may be implemented as unit-level current-mode or voltage-mode drivers. In some implementations, each line driver 308 may receive sets of signals 316a, 316b and 316c that determine the output state of corresponding signal wires 318a, 318b and 318c. In one example, each of the sets of signals 316a, 316b and 316c may include two or more signals, including a pull-up signal (PU signal) and a pull-down signal (PD signal) that, when high, activate pull-up and pull down circuits that drive the signal wires 318a, 318b and 318c toward a higher level or lower level voltage, respectively. In this example, when both the PU signal and the PD signal are low, the signal wires 318a, 318b and 318c may be terminated to a mid-level voltage.

For each transmitted symbol interval in an M-wire, N-phase polarity encoding scheme, at least one signal wire 318a, 318b or 318c is in the midlevel/undriven (0) voltage or current state, while the number of positively driven (+1 voltage or current state) signal wires 318a, 318b or 318c is equal to the number of negatively driven (−1 voltage or current state) signal wires 318a, 318b or 318c, such that the sum of current flowing to the receiver is always zero. For each symbol, the signaling state of at least one signal wire 318a, 318b or 318c is changed from the wire state transmitted in the preceding transmission interval.

In operation, a mapper 302 may receive and map 16-bit data 310 to 7 symbols 312. In the 3-wire example, each of the 7 symbols defines the states of the signal wires 318a, 318b and 318c for one symbol interval. The 7 symbols 312 may be serialized using parallel-to-serial converters 304 that provide a timed sequence of symbols 314 for each signal wire 318a, 318b and 318c. The sequence of symbols 314 is typically timed using a transmission clock. A 3-wire, 3-phase encoder 306 receives the sequence of 7 symbols 314 produced by the mapper one symbol at a time and computes the state of each signal wire 318a, 318b and 318c for each symbol interval. The 3-wire, 3-phase encoder 306 selects the states of the signal wires 318a, 318b and 318c based on the current input symbol 314 and the previous states of signal wires 318a, 318b and 318c.

The use of M-wire, N-phase encoding permits a number of bits to be encoded in a plurality of symbols where the bits per symbol is not an integer. In the example of a 3-wire communication link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5)=2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
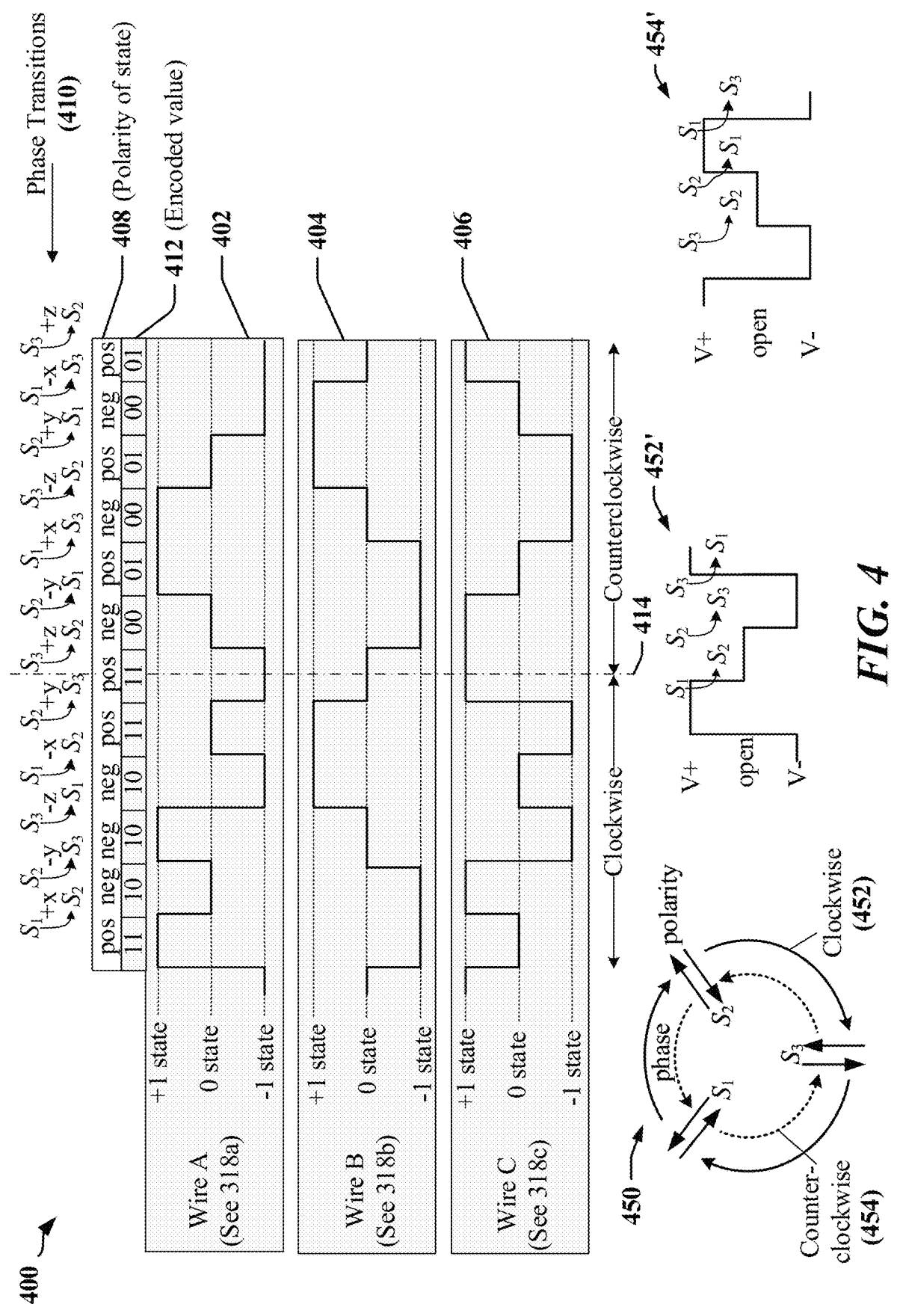

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 452' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three signal wires 318a, 318b and 318c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 318a, 318b and 318c is in a different signaling states than the other wires. When more than 3 signal wires 318a, 318b and 318c are used in a 3-phase encoding system, two or more signal wires 318a, 318b and/or 318c can be in the same signaling state at each signaling interval, although each state is present on at least one signal wire 318a, 318b and/or 318c in every signaling interval.

Information may be encoded in the direction of rotation at each phase transition 410, and the 3-phase signal may change direction for each signaling state. Direction of rotation may be determined by considering which signal wires 318a, 318b and/or 318c are in the '0' state before and after a phase transition, because the undriven signal wire 318a, 318b and/or 318c changes at every signaling state in a rotating three-phase signal, regardless of the direction of rotation.

The encoding scheme may also encode information in the polarity 408 of the two signal wires 318a, 318b and/or 318c that are actively driven. At any time in a 3-wire implementation, exactly two of the signal wires 318a, 318b, 318c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 318a, 318b and 318c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5)=2.32$ bits encoded per symbol (transition), which allows the mapper 302 to accept a 16-bit word and encode it in 7 symbols.

Figure 5:
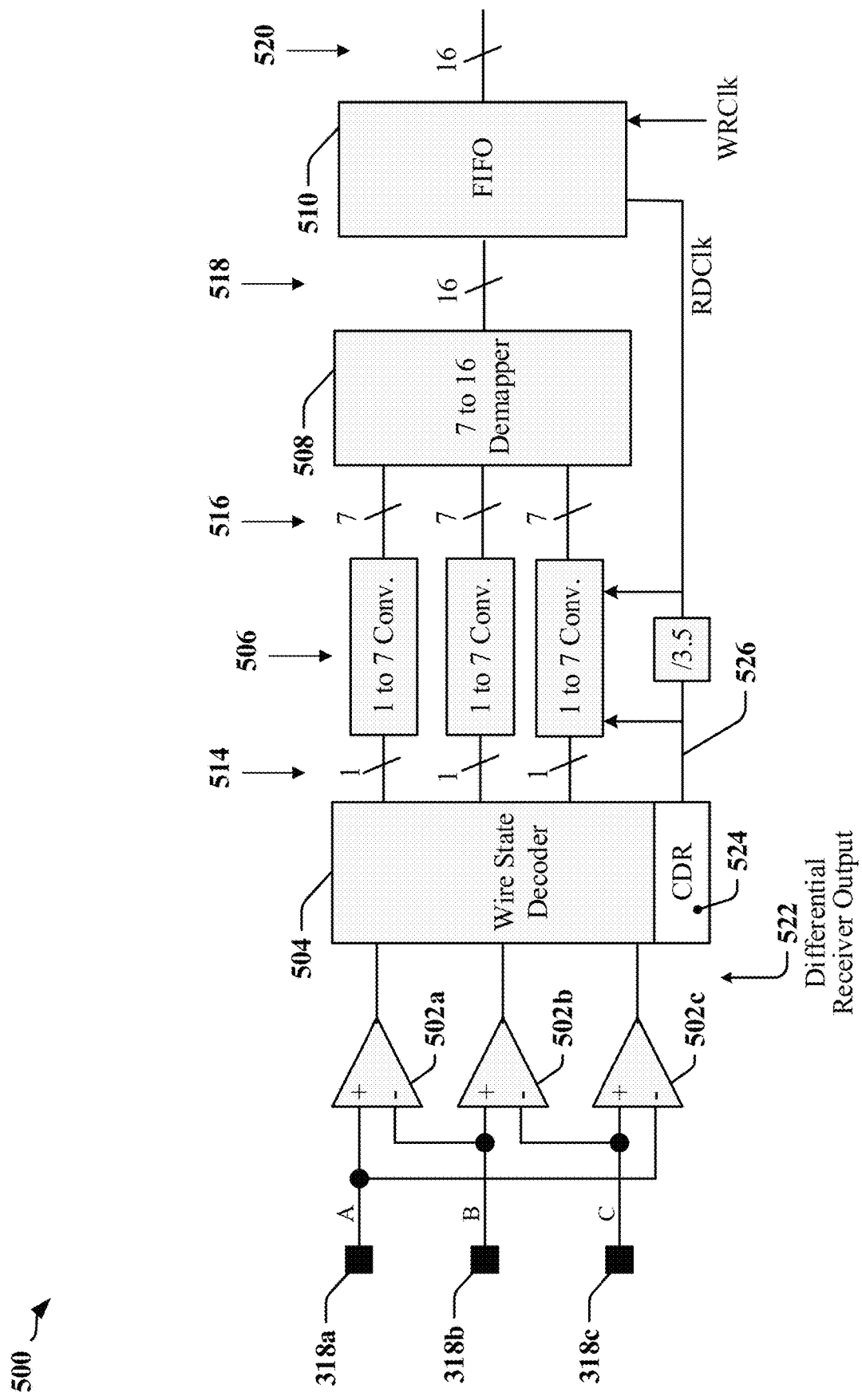
FIG. 5 illustrates a C-PHY 3-phase receiver.

FIG. 5 is a diagram illustrating certain aspects of a 3-wire, 3-phase decoder 500. Differential receivers 502a, 502b, 502c and a wire state decoder 504 are configured to provide a digital representation 522 of the state of the three transmission lines (e.g., the signal wires 318a, 318b and 318c illustrated in FIG. 3), with respect to one another, and to detect changes in the state of the three transmission lines compared to the state transmitted in the previous symbol period. Seven consecutive states are assembled by the serial-to-parallel convertors 506 to obtain a set of 7 symbols 516 to be processed by the demapper 508. The demapper 508 produces 16 bits of data 518 that may be buffered in a first-in-first-out (FIFO) register 510 to provide output data 520.

The wire state decoder 504 may extract a sequence of symbols 514 from phase encoded signals received on the signal wires 318a, 318b and 318c. The symbols 514 are encoded as a combination of phase rotation and polarity as disclosed herein. The wire state decoder may include a CDR circuit 524 that extracts a clock 526 that can be used to reliably capture wire states from the signal wires 318a, 318b and 318c. A transition occurs on least one of the signal wires 318a, 318b and 318c at each symbol boundary and the CDR circuit 524 may be configured to generate the clock 526 based on the occurrence of a transition or multiple transitions. An edge of the clock may be delayed to allow time for all signal wires 318a, 318b and 318c to have stabilized and to thereby ensure that the current wire state is captured for decoding purposes.

Figure 6:
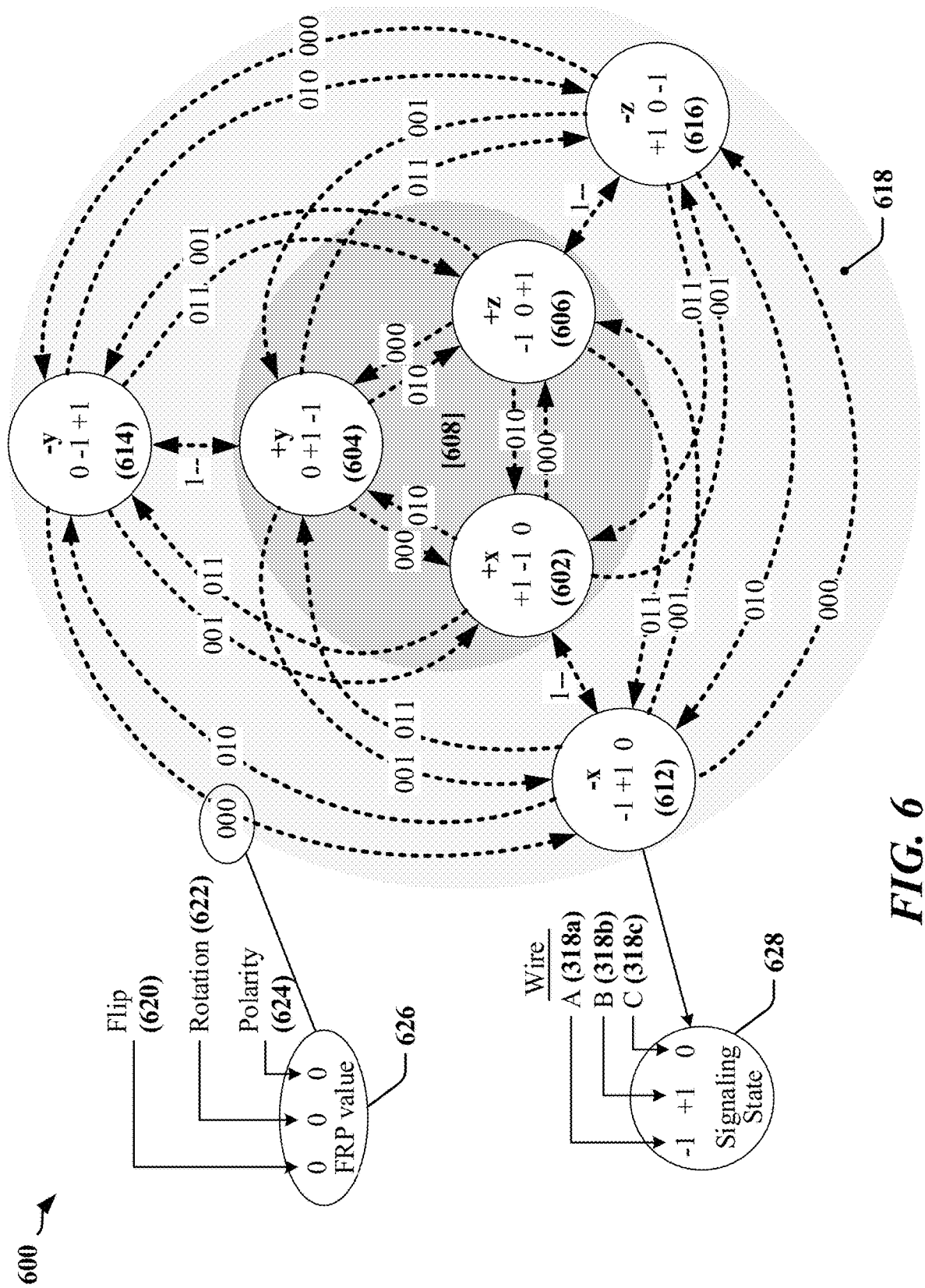
FIG. 6 is a state diagram illustrating potential state transitions in a C-PHY 3-phase encoded interface.

FIG. 6 is state diagram 600 illustrating the possible signaling states 602, 604, 606, 612, 614, 616 of the three wires, with the possible transitions illustrated from each state. In the example of a 3-wire, 3-phase communication link, 6 states and 30 state transitions are available. The possible signaling states 602, 604, 606, 612, 614 and 616 in the state diagram 600 include and expand on the states shown in the circular state diagram 450 of FIG. 4. As shown in the exemplar of a state element 628, each signaling state 602, 604, 606, 612, 614 and 616 in the state diagram 600 defines voltage signaling state of the signal wires 318a, 318b, 318c, which are labeled A, B and C respectively. For example, in signaling state 602 (+x) wire A=+1, wire B=−1 and wire C=0, yielding output of differential receiver 502a (A−B)=+2, differential receiver 502b (B−C)=−1 and differential receiver 502c (C−A)=−1. Transition decisions taken by phase change detect circuits in a receiver are based on 5 possible levels produced by the differential receivers 502a, 502b, 502c, which include −2, −1, 0, +1 and +2 voltage states.

The transitions in the state diagram 600 can be represented by a Flip, Rotate, Polarity symbol (e.g., the FRP symbol 626) that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state diagram 600 may be separated into an inner circle 608 that includes the positive polarity signaling states 602, 604, 606 and an outer circle 618 that encompasses the negative polarity signaling states 612, 614, 616.

Jitter in 3-Phase Interfaces

A 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
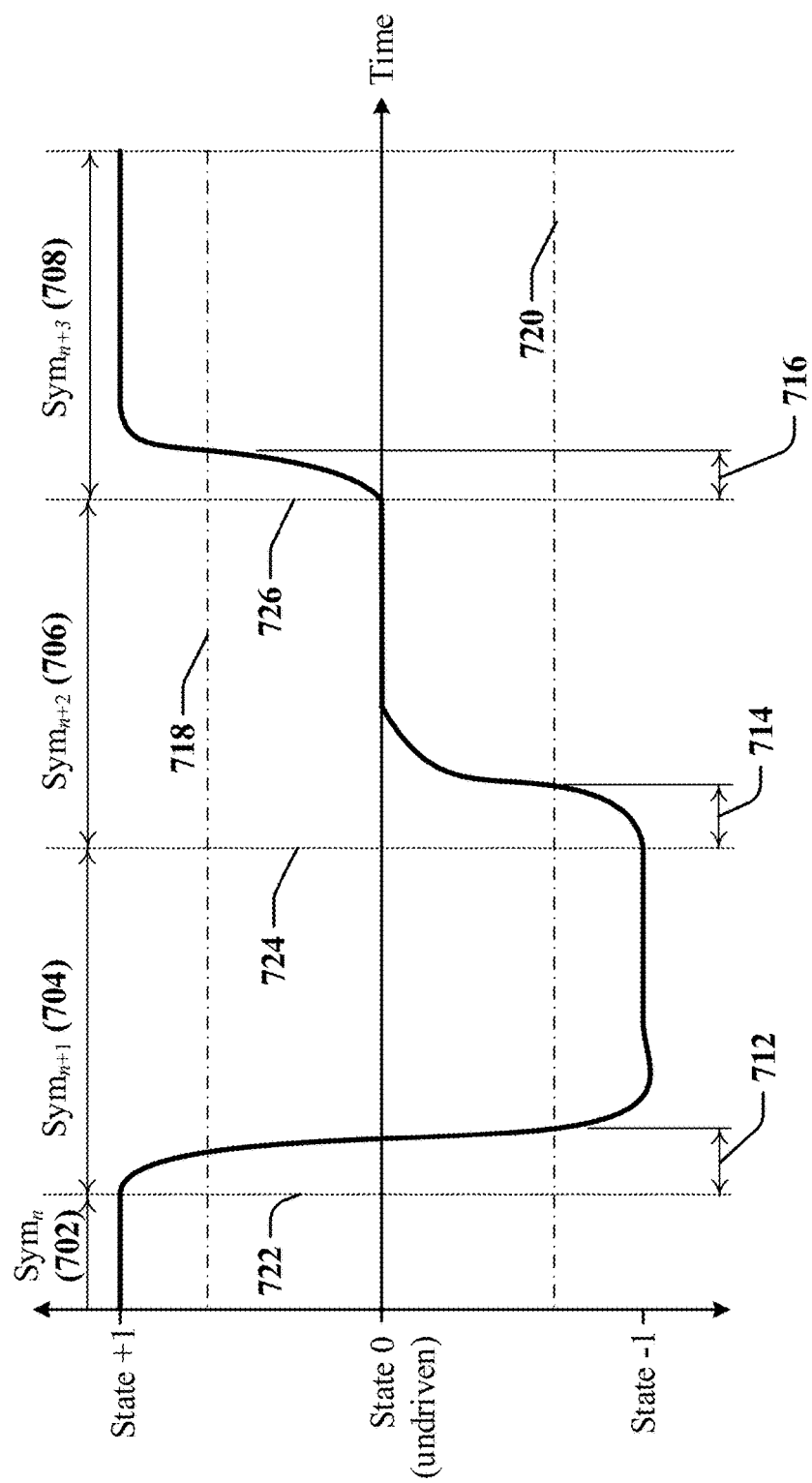
FIG. 7 is an example of the effects of signal rise times on transition detection in a C-PHY decoder.

FIG. 7 is a timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a signal received from a single signal wire 318a, 318b or 318c. A first symbol $Sym_n$ 702 is transmitted in a first symbol interval that ends at a time 722 when a second symbol $Sym_{n+1}$ 724 is transmitted in a second symbol interval. The second symbol interval may end at time 726 when a third symbol $Sym_{n+2}$ 706 is transmitted in the third symbol interval, which ends when a fourth symbol $Sym_{n+3}$ 708 is transmitted in a fourth symbol interval. The transition from a state determined by the first symbol 702 to the state corresponding to the second symbol 704 may be detectable after a delay 712 attributable to the time taken for voltage in the signal wire 318a, 318b or 318c to reach a threshold voltage 718 and/or 720. The threshold voltages may be used to determine the state of the signal wire 318a, 318b or 318c. The transition from a state determined by the second symbol 704 to the state for the third symbol 706 may be detectable after a delay 714 attributable to the time taken for voltage in the signal wire 318a, 318b or 318c to reach one of the threshold voltages 718 and/or 720. The transition from a state determined by the third symbol 706 to the state for the fourth symbol 708 may be detectable after a delay 716 attributable to the time taken for voltage in the signal wire 318a, 318b or 318c to reach a threshold voltage 718 and/or 720. The delays 712, 714 and 716 may have different durations, which may be attributable in part to variations in device manufacturing processes and operational conditions, which may produce unequal effects on transitions between different voltage or current levels associated with the 3 states and/or different transition magnitudes. These differences may contribute to jitter and other issues in C-PHY 3-phase receiver.

Figure 8:
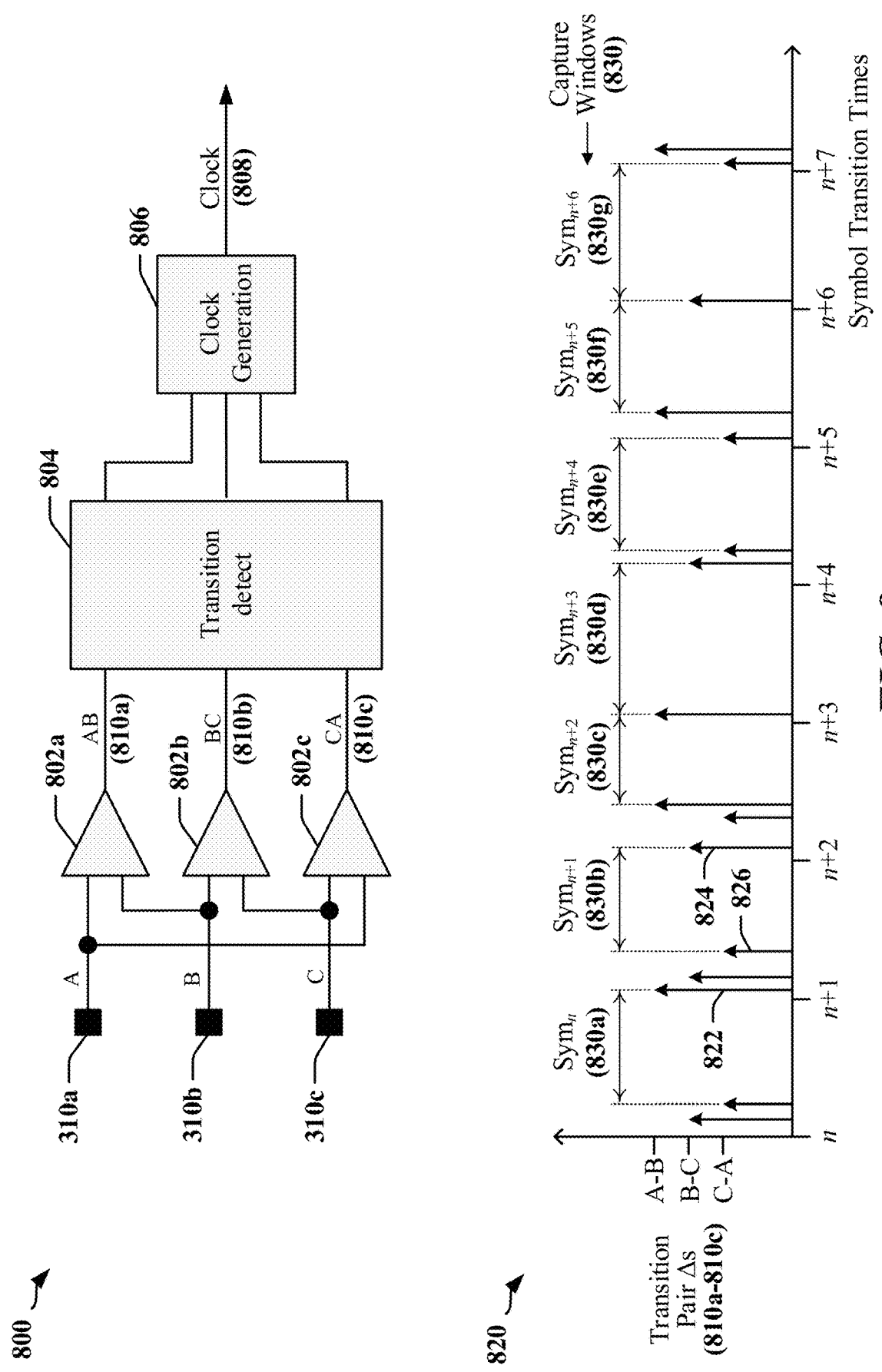
FIG. 8 illustrates transition detection in a C-PHY decoder.

FIG. 8 illustrates certain aspects of CDR circuits that may be provided in a receiver in a C-PHY interface 800. Differential receivers 802a, 802b and 802c are configured to generate a set of difference signals 810a, 810b, 810c by comparing signaling state of each different pair of signal wires 318a, 318b and 318c in a trio. In the illustrated example, a first differential receiver 802a provides an AB difference signal 810a representative of the difference in signaling state of A and B signal wires 318a and 318b, a second differential receiver 802b provides a BC difference signal 810b representative of the difference in signaling state of B and C signal wires 318b and 318c and a third differential receiver 802c provides a CA difference signal 810c representative of the difference in signaling state of C and A signal wires 318c and 318a. Accordingly, a transition detection circuit 804 can be configured to detect occurrence of a phase change because the output of at least one of the differential receivers 802a, 802b and 802c changes at the end of each symbol interval.

Transitions between some consecutively transmitted pairs of symbols may be detectable by a single differential receiver 802a, 802b or 802c, while other transitions may be detected by two or more of the differential receivers 802a, 802b and 802c. In one example the states, or relative states of two wires may be unchanged after a transition and the output of a corresponding differential receiver 802a, 802b or 802c may also be unchanged after the phase transition. Accordingly, a clock generation circuit 806 may include a transition detection circuit 804 and/or other logic to monitor the outputs of all differential receivers 802a, 802b and 802c in order to determine when a phase transition has occurred. The clock generation circuit may generate a receive clock signal 808 based on detected phase transitions.

Changes in signaling states of the 3 wires in a trio may be detected at different times, which can result in the difference signals 810a, 810b, 810c assuming stable states at different times. The state of the difference signals 810a, 810b, 810c may switch before stability has been reached after the signaling state of each signal wire 318a, 318b and/or 318c has transitioned to its defined state for a symbol transmission interval. The result of such variability is illustrated in the timing diagram 820 of FIG. 8.

The timing of signaling state change detection may vary according to the type of signaling state change that has occurred. Markers 822, 824 and 826 represent occurrences of transitions in the difference signals 810a, 810b, 810c provided to the transition detection circuit 804. The markers 822, 824 and 826 are assigned different heights in the timing diagram 820 for clarity of illustration only, and the relative heights of the markers 822, 824 and 826 are not intended to show a specific relationship to voltage or current levels, polarity or weighting values used for clock generation or data decoding. The timing diagram 820 illustrates the effect of timing of transitions associated with symbols transmitted in phase and polarity on the three signal wires 318a, 318b and 318c. In the timing diagram 820, transitions between some symbols may result in variable capture windows 830a, 830b, 830c, 830d, 830e, 830f and/or 830g (collectively symbol capture windows 830) during which symbols may be reliably captured. The number of state changes detected and their relative timing can result in jitter on the clock signal 808.

The throughput of a C-PHY communication link may be affected by duration and variability in signal transition times. For example, variability in detection circuits may be caused by manufacturing process tolerances, variations and stability of voltage and current sources and operating temperature, as well as by the electrical characteristics of the signal wires 318a, 318b and 318c. The variability in detection circuits may limit channel bandwidth.

Figure 9:
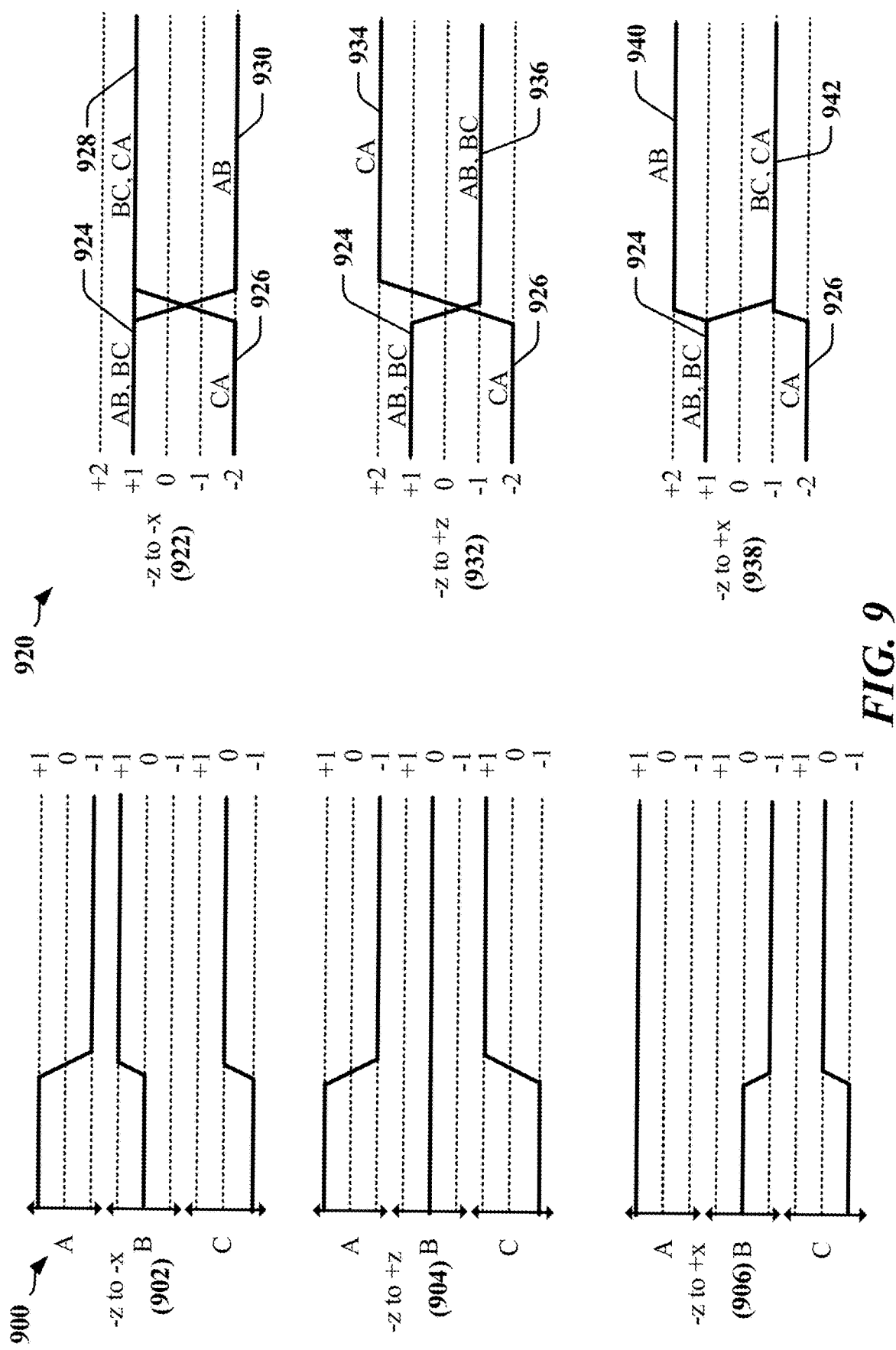
FIG. 9 illustrates one example of signal transitions occurring between pairs of consecutive symbols transmitted on a C-PHY interface.

FIG. 9 includes timing diagrams 900 and 920 representative of certain examples of transitions from a first signaling state to a second signaling state between certain consecutive symbols. The signaling state transitions illustrated in the timing diagrams 900 and 920 are selected for illustrative purposes, and other transitions and combinations of transitions can occur in a MIPI Alliance C-PHY interface. The timing diagrams 900 and 920 relate to an example of a 3-wire, 3-phase communication link, in which multiple receiver output transitions may occur at each symbol interval boundary due to differences in rise and fall time between the signal levels on the trio of wires. With reference also to FIG. 8, the first timing diagrams 900 illustrate the signaling states of the trio of signal wires 318a, 318b and 318c (A, B, and C) before and after a transition and second timing diagrams 920 illustrate the outputs of the differential receivers 802a, 802b and 802c, which provides difference signals 810a, 810b, 810c representative of the differences between signal wires 318a, 318b and 318c. In many instances, a set of differential receivers 802a, 802b and 802c may be configured to capture transitions by comparing different combinations for two signal wires 318a, 318b and 318c. In one example, these differential receivers 802a, 802b and 802c may be configured to produce outputs by determining the difference (e.g. by subtraction) of their respective input voltages.

In each of the examples shown in the timing diagrams 900 and 920, the initial a symbol representing the −z state 616 (see FIG. 8) transitions to a different symbol. As shown in the timing diagrams 902, 904 and 906 signal A is initially in a +1 state, signal B is in a 0 state and signal C is in the −1 state. Accordingly, the differential receivers 802a, 802b initially measure a +1 difference 924 and the differential receiver 802c measures a −2 difference 926, as shown in the timing diagrams 922, 932, 938 for the differential receiver outputs.

In a first example corresponding to the timing diagrams 902, 922, a transition occurs from a symbol representing the −z state 616 to a symbol representing the −x signaling state 612 (see FIG. 6) in which signal A transitions to a −1 state, signal B transitions to a +1 state and signal C transitions to a 0 state, with the differential receiver 802a transitioning from +1 difference 924 to a −2 difference 930, differential receiver 802b remaining at a +1 difference 924, 928 and differential receiver 802c transitioning from a −2 difference 926 to a +1 difference 928.

In a second example corresponding to the timing diagrams 904, 932, a transition occurs from a symbol representing the −z signaling state 616 to a symbol representing the +z signaling state 606 in which signal A transitions to a −1 state, signal B remains at the 0 state and signal C transitions to a +1 state, with two differential receivers 802a and 802b transitioning from +1 difference 924 to a −1 difference 936, and differential receiver 802c transitioning from −2 difference 926 to a +2 difference 934.

In a third example corresponding to the timing diagrams 906, 938, a transition occurs from a symbol representing the −z signaling state 616 to a symbol representing the +x signaling state 602 in which signal A remains at the +1 state, signal B transitions to the −1 state and signal C transitions to a 0 state, with the differential receiver 802a transitioning from a +1 difference 924 to a +2 difference 940, the differential receiver 802b transitioning from a +1 difference 924 to a −1 difference 942, and the differential receiver 802c transitioning from −2 difference 926 to a −1 difference 942.

These examples illustrate transitions in difference values spanning 0, 1, 2, 3, 4 and 5 levels. Pre-emphasis techniques used for typical differential or single-ended serial transmitters were developed for two level transitions and may introduce certain adverse effects if used on a MIPI Alliance C-PHY 3-phase signal. In particular, a pre-emphasis circuit that overdrives a signal during transitions may cause overshoot during transitions spanning 1 or 2 levels and may cause false triggers to occur in edge sensitive circuits.

Figure 10:
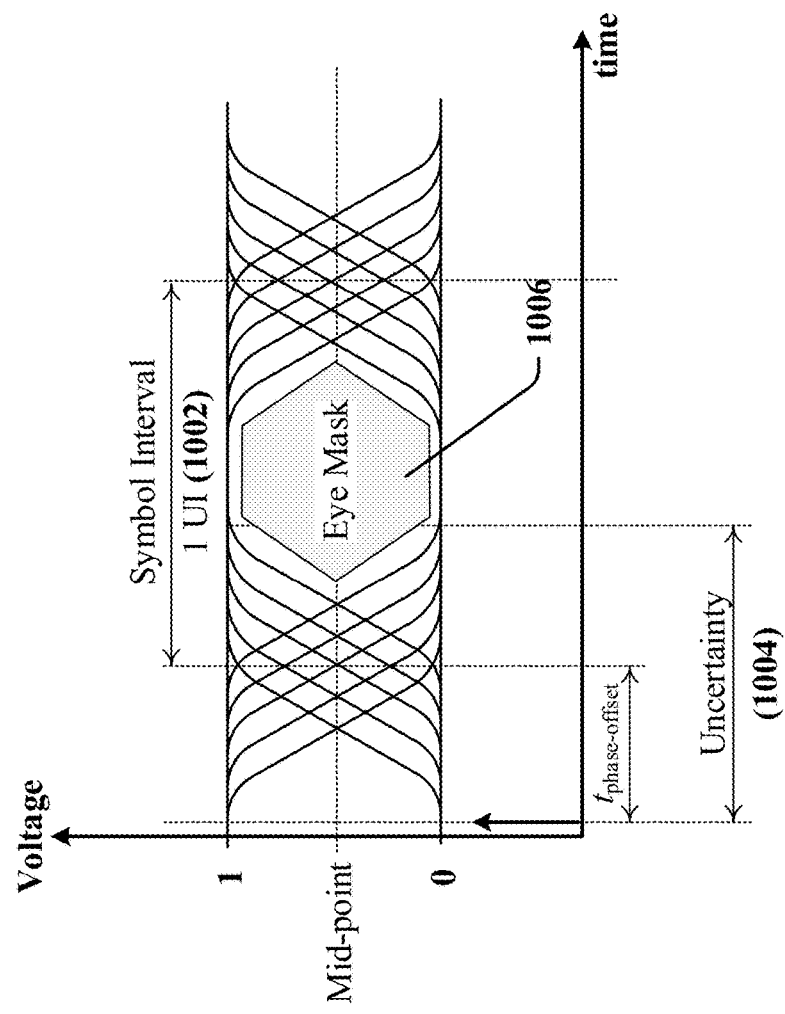
FIG. 10 illustrates transition regions and eye regions in an eye-pattern.

FIG. 10 illustrates a binary eye pattern 1000 generated as an overlay of multiple symbol intervals, including a single symbol interval 1002. A signal transition region 1004 represents a time period of uncertainty at the boundary between two symbols where variable signal rise times prevent reliable decoding. State information may be determined reliably in a region defined by an eye mask 1006 within an "eye opening" that represents the time period in which the symbol is stable and can be reliably received and decoded. The eye mask 1006 masks off a region in which zero crossings do not occur, and the eye mask is used by the decoder to prevent multiple clocking due to the effect of subsequent zero crossings at the symbol interval boundary that follow the first signal zero crossing.

The concept of periodic sampling and display of the signal is useful during design, adaptation and configuration of systems which use a clock-data recovery circuit that re-creates the received data-timing signal using frequent transitions appearing in the received data. A communication system based on Serializer/Deserializer (SERDES) technology is an example of a system where a binary eye pattern 1000 can be utilized as a basis for judging the ability to reliably recover data based on the eye opening of the binary eye pattern 1000.

An M-wire N-Phase encoding system, such as a 3-wire, 3-phase encoder may encode a signal that has at least one transition at every symbol boundary and the receiver may recover a clock using those guaranteed transitions. The receiver may require reliable data immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A–B, B–C, and C–A outputs of differential receivers 802a, 802b and 802c of FIG. 6).

Figure 11:
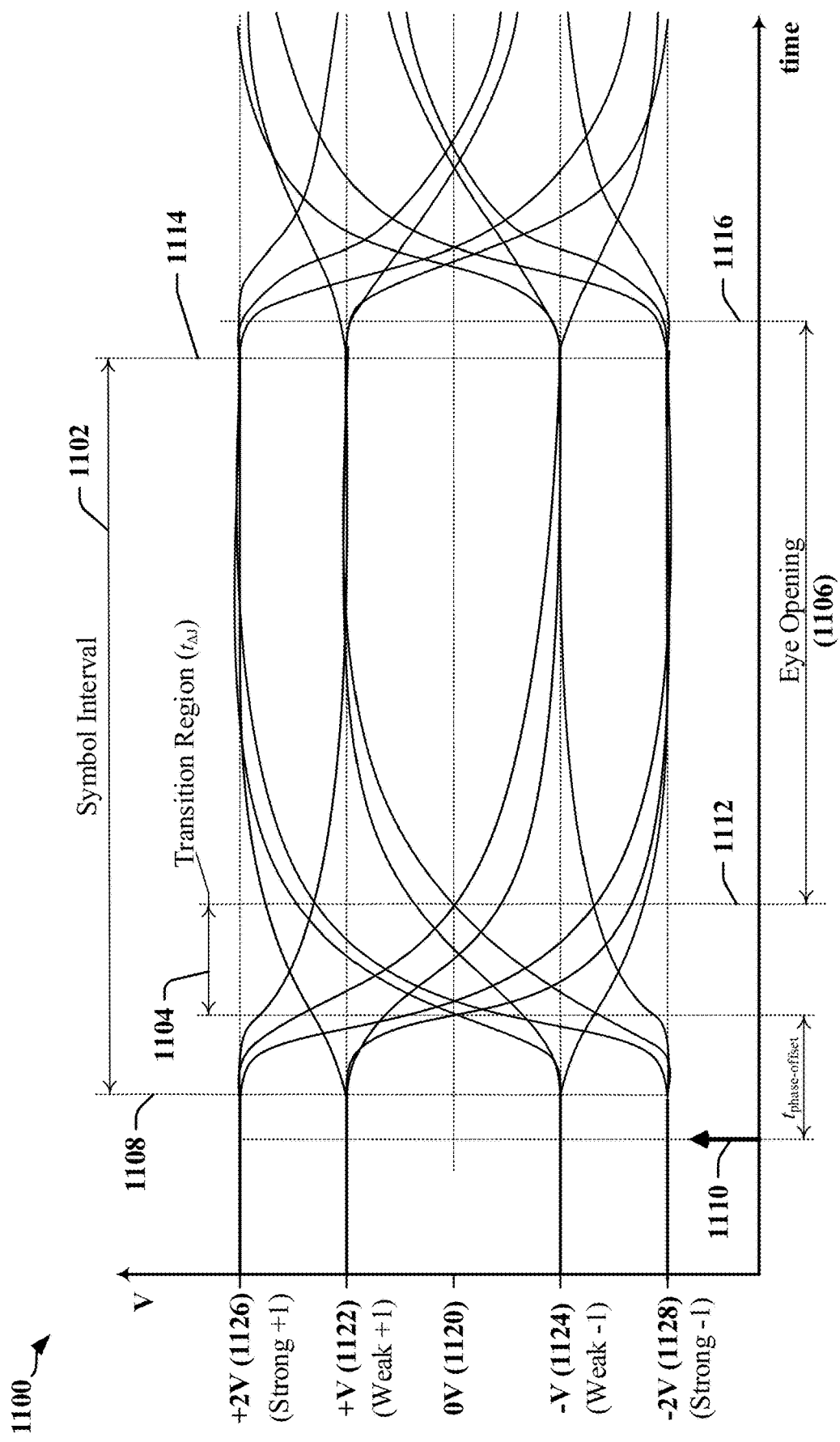
FIG. 11 illustrates an example of an eye-pattern generated for a C-PHY 3-Phase interface.

FIG. 11 illustrates an example of a multi-level eye-pattern 1100 generated for a C-PHY 3-phase signal. The multi-level eye-pattern 1100 may be generated from an overlay of multiple symbol intervals 1102. The multi-level eye-pattern 1100 may be produced using a fixed and/or symbol-independent trigger 1110. The multi-level eye-pattern 1100 includes an increased number of voltage levels 1120, 1122, 1124, 1126, 1128 that may be attributed to the multiple voltage levels measured by the differential receivers 802a, 802b, 802c an N-phase receiver circuit (see FIG. 8). In the example, the multi-level eye-pattern 1100 may correspond to possible transitions in 3-wire, 3-phase encoded signals provided to the differential receivers 802a, 802b, and 802c. The three voltage levels may cause the differential receivers 802a, 802b, and 802c to generate strong voltage levels 1126, 1128 and weak voltage levels 1122, 1124 for both positive and negative polarities. Typically, only one signal wire 318a, 318b and 318c is undriven in any symbol and the differential receivers 802a, 802b, and 802c do not produce a 0 state (here, 0 Volts) output. The voltages associated with strong and weak levels need not be evenly spaced with respect to a 0 Volts level. For example, the weak voltage levels 1122, 1124 represent a comparison of voltages that may include the voltage level reached by an undriven signal wire 318a, 318b and 318c. The multi-level eye-pattern 1100 may overlap the waveforms produced by the differential receivers 802a, 802b, and 802c because all three pairs of signals are considered simultaneously when data is captured at the receiving device. The waveforms produced by the differential receivers 802a, 802b, and 802c are representative of difference signals 810a, 810b, 810c representing comparisons of three pairs of signals (A–B, B–C, and C–A).

Drivers, receivers and other devices used in a C-PHY 3-Phase decoder may exhibit different switching characteristics that can introduce relative delays between signals received from the three wires. Multiple receiver output transitions may be observed at each symbol interval boundary 1108 and/or 1114 due to slight differences in the rise and fall time between the three signals of the trio of signal wires 318a, 318b, 318c and due to slight differences in signal propagation times between the combinations of pairs of signals received from the signal wires 318a, 318b, 318c. The multi-level eye-pattern 1100 may capture variances in rise and fall times as a relative delay in transitions near each symbol interval boundary 1108 and 1114. The variances in rise and fall times may be due to the different characteristics of the 3-Phase drivers. Differences in rise and fall times may also result in an effective shortening or lengthening of the duration of the symbol interval 1102 for any given symbol.

A signal transition region 1104 represents a time, or period of uncertainty, where variable signal rise times prevent reliable decoding. State information may be reliably determined in an "eye opening" 1106 representing the time period in which the symbol is stable and can be reliably received and decoded. In one example, the eye opening 1106 may be determined to begin at the end 1112 of the signal transition region 1104, and end at the symbol interval boundary 1114 of the symbol interval 1102. In the example depicted in FIG. 11, the eye opening 1106 may be determined to begin at the end 1112 of the signal transition region 1104, and end at a time 1116 when the signaling state of the signal wires 318a, 318b, 318c and/or the outputs of the three differential receivers 802a, 802b and 802c have begun to change to reflect the next symbol.

The maximum speed of a communication link 220 configured for N-Phase encoding may be limited by the duration of the signal transition region 1104 compared to the eye opening 1106 corresponding to the received signal. The minimum period for the symbol interval 1102 may be constrained by tightened design margins associated with the CDR circuit 524 in the decoder 500 illustrated in FIG. 5, for example. Different signaling state transitions may be associated with different variations in signal transition times corresponding to two or more signal wires 318a, 318b and/or 318c, thereby causing the outputs of the differential receivers 802a, 802b and 802c in the receiving device to change at different times and/or rates with respect to the symbol interval boundary 1108, where the inputs of the differential receivers 802a, 802b and 802c begin to change. The differences between signal transition times may result in timing skews between signaling transitions in two or more difference signals 810a, 810b, 810c. CDR circuits may include delay circuits and other circuits to accommodate timing skews between the difference signals 810a, 810b, 810c.

Figure 12:
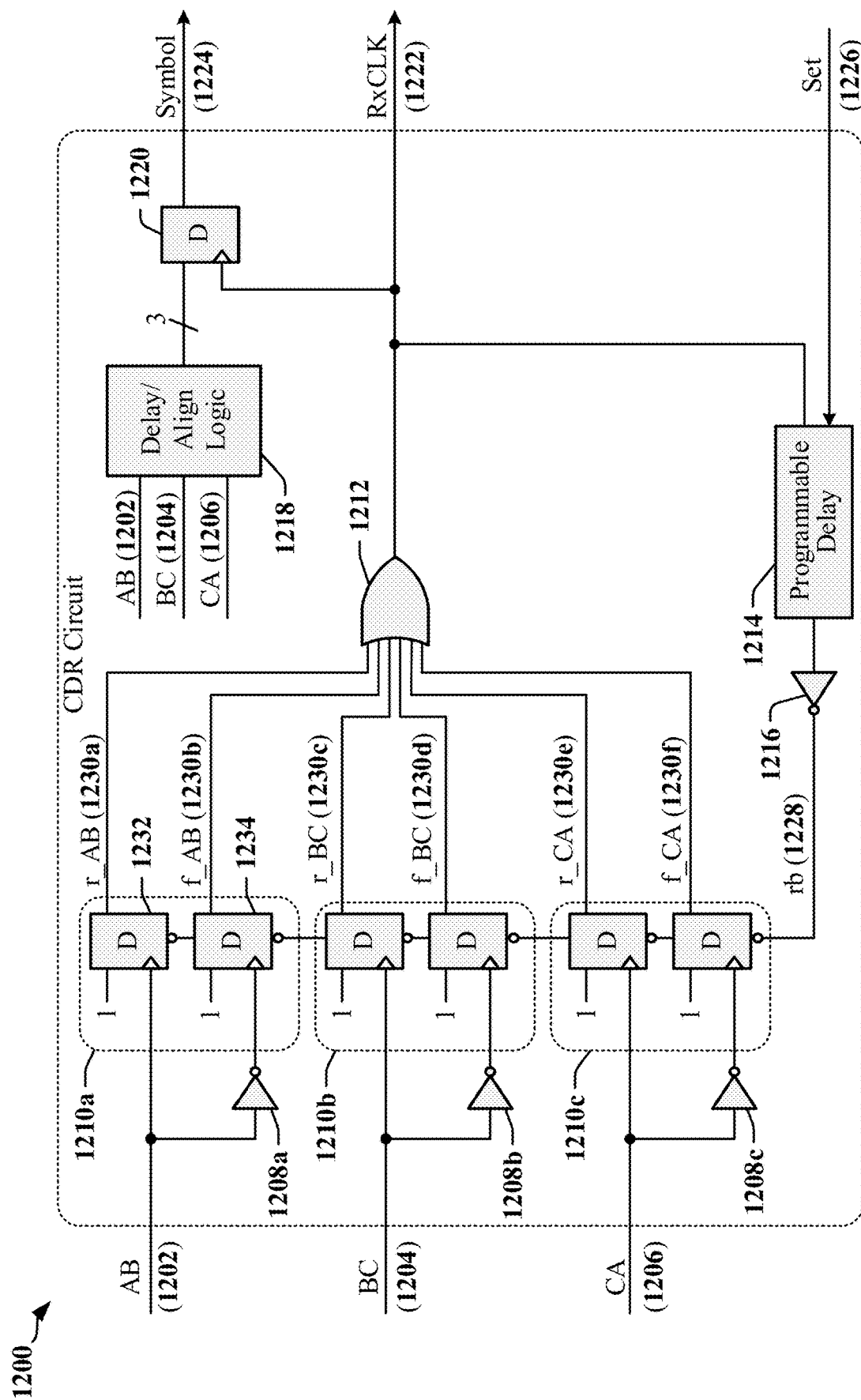
FIG. 12 illustrates an example of a CDR circuit for a C-PHY 3-Phase interface.

FIG. 12 provides an example of a CDR circuit 1200 for a 3-wire, 3-phase interface. The illustrated CDR circuit 1200 includes certain features and functional elements that are common to many different types of clock recovery circuits. The CDR circuit 1200 receives difference signals 1202, 1204, 1206, which may be derived from the difference signals 810a, 810b, 810c produced by the differential receivers 802a, 802b and 802c of FIG. 8 for example. In the CDR circuit 1200, each difference signal 1202, 1204, 1206 clocks a pair of D flipflops 1210a, 1210b, 1210c to produce output signals 1230a-1230f. The output signals 1230a-1230f carry a pulse when a transition is detected on the corresponding difference signal 1202, 1204, 1206. A rising edge provided to a clock input on a D flipflop clocks a logic one through the D flipflop. Inverters 1208a, 1208b, 1208c may be used to provide inverted versions of the difference signals 1202, 1204, 1206 to one of the D flipflops in each corresponding pair of D flipflops 1210a, 1210b, 1210c. Accordingly, each pair of D flipflops 1210a, 1210b, 1210c produces pulses responsive to rising edge and falling edges detected in the corresponding difference signal 1202, 1204, 1206.

For example, the AB difference signal 1202 is provided to a first D flipflop 1232 of a first pair of D flipflops 1210a, and the inverter 1208a provides an inverted version of the AB difference signal 1202 to a second D flipflop 1234 of the first pair of D flipflops 1210a. The D flipflops are initially in a reset state. A rising edge on the AB difference signal 1202 clocks a logic one through the first D flipflop 1232 causing the output of the first flipflop (r_AB) 1230a to transition to a logic one state. A falling edge on the AB difference signal 1202 clocks a logic one through the second D flipflop 1234 causing the output of the second flipflop (f AB) 1230b to transition to a logic one state.

The output signals 1230a-1230f are provided to logic, such as the OR gate 1212, which produces an output signal that may serve as the receiver clock (RxCLK) signal 1222. The RxCLK signal 1222 transitions to a logic one state when a transition occurs in signaling state of any of the difference signals 1202, 1204, 1206. The RxCLK signal 1222 is provided to a programmable delay circuit 1214, which drives a reset signal (rb signal 1228) that resets the D flipflops in the pairs of D flipflops 1210a, 1210b, 1210c. In the illustrated example, an inverter 1216 may be included when the D flipflops are reset by a low signal. When the D flipflops are reset, the output of the OR gate 1212 returns to the logic 0 state and the pulse on the RxCLK signal 1222 is terminated. When this logic 0 state propagates through the programmable delay circuit 1214 and the inverter 1216, the reset condition on the D flipflops is released. While the D flipflops are in the reset condition, transitions on the difference signals 1202, 1204, 1206 are ignored.

The programmable delay circuit 1214 is typically configured to produce a delay that has a duration that exceeds the difference in the timing skew between the occurrence of first and last transitions on the difference signals 1202, 1204, 1206. The programmable delay circuit 1214 configures the duration of pulses (i.e., the pulse width) on the RxCLK signal 1222. The programmable delay circuit 1214 may be configured when a Set signal 1226 is asserted by a processor or other control and/or configuration logic.

The RxCLK signal 1222 may also be provided to a set of three flipflops 1220 that capture the signaling state of the difference signals 1202, 1204, 1206, providing a stable output symbol 1224 for each pulse that occurs on the RxCLK signal 1222. Delay or alignment logic 1218 may adjust the timing of the set of difference signals 1202, 1204, 1206. For example, the delay or alignment logic 1218 may be used to adjust the timing of the difference signals 1202, 1204, 1206 with respect to the pulses on the RxCLK signal 1222 to ensure that the flipflops 1220 capture the signaling state of the difference signals 1202, 1204, 1206 when the difference signals 1202, 1204, 1206 are stable. The delay or alignment logic 1218 may delay edges in the difference signals 1202, 1204, 1206 based on the delay configured for the programmable delay circuit 1214.

The programmable delay circuit 1214 may be configured in the CDR circuit 1200 to accommodate possible large variations in transition times in the difference signals 1202, 1204, 1206. In one example, the programmable delay circuit 1214 is typically configured to provide a minimum delay period that exceeds the duration of the timing skew between the occurrence of the first and last transitions on the difference signals 1202, 1204, 1206. The delay time provided by the programmable delay circuit 1214 is calculated to account for the number of logic gates in the delay loop of the CDR circuit 1200 and is constrained to a minimum delay time that accounts for expected or observed PVT variances that can affect the logic gates and/or the programmable delay circuit 1214. For reliable operation of the CDR circuit 1200, the maximum delay time provided by the programmable delay circuit 1214 may not be greater than the symbol interval. At faster data rates, timing skew and the delay time provided by the delay loop of the CDR circuit 1200 increase as a proportion of the symbol interval 1102. The eye opening 1106 can become small in comparison to the symbol interval 1102 and the eye opening 1106 can close at higher frequencies. The maximum symbol transmission rate may be limited when the delay time provided by the programmable delay circuit 1214 reduces the percentage of the symbol interval 1102 occupied by the eye opening 1106 below a threshold size that can support reliable capture of symbols.

Figure 13:
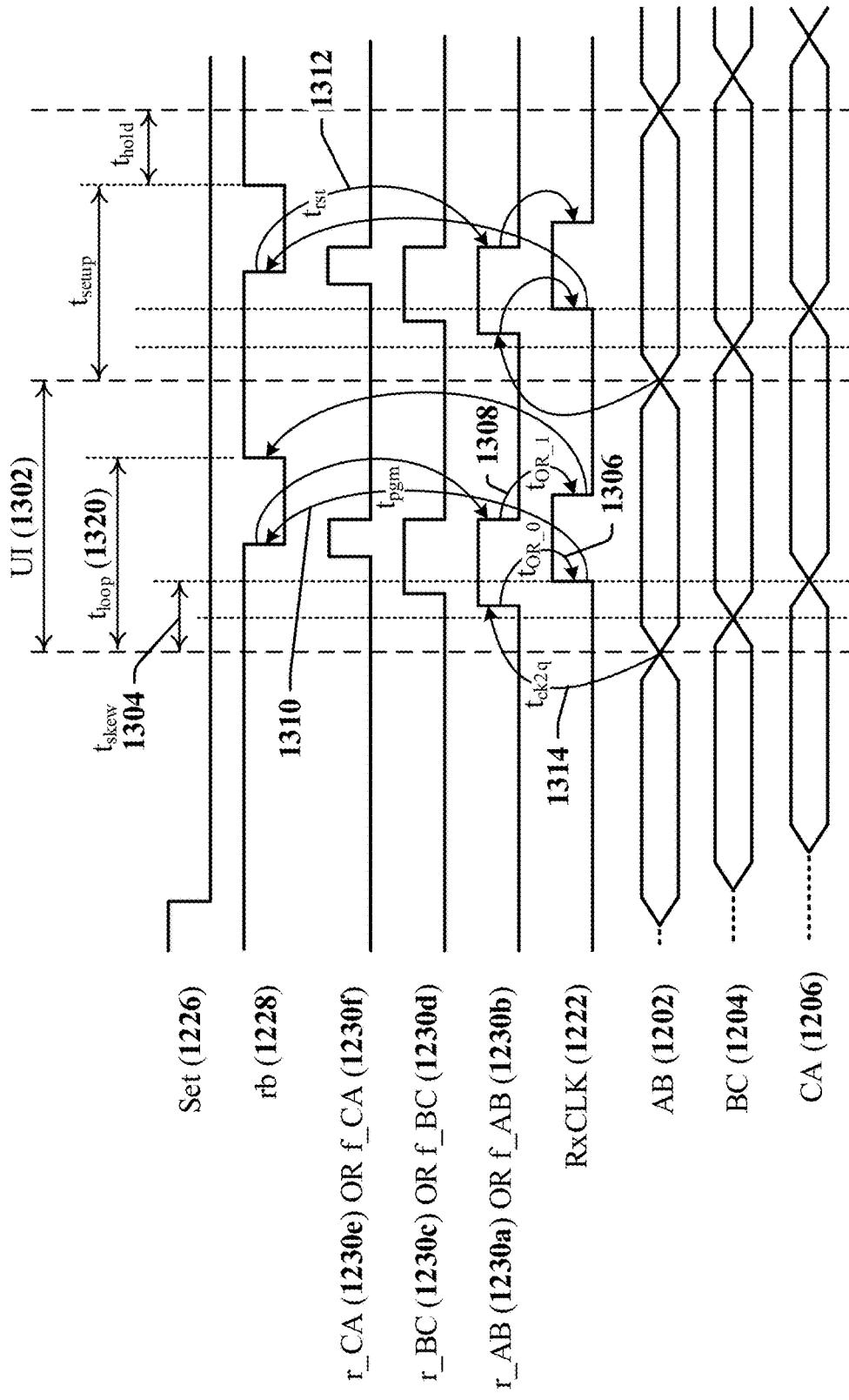
FIG. 13 illustrates timing associated with the CDR circuit of FIG. 12.

FIG. 13 is a timing diagram 1300 that illustrates certain aspects of the operation of the CDR circuit 1200. The diagram relates to operations after the programmable delay circuit 1214 has been configured, and the Set signal 1226 is inactive. The CDR circuit 1200 operates as an edge detector. C-PHY 3-phase encoding provides a single signaling state transition per unit interval (UI) 1302. Differences in the state of each wire of the trio, and/or transmission characteristics of the trio may cause a transition to appear at different times on two or more wires. The maximum difference in time of occurrence of transitions in the difference signals 1202, 1204, 1206 may be referred to as the skew time ($t_{skew}$) 1304. Other delays associated with the CDR circuit 1200 include the propagation delay ($t_{ck2}$) 1314 through the pairs of D flipflops 1210a, 1210b, 1210c, the propagation delay ($t_{OR\_0}$) 1306 associated with a rising edge passed through the OR gate 1212, the propagation delay ($t_{OR\_1}$) 1308 associated with a falling edge passed through the OR gate 1212, the programmable delay ($t_{pgm}$) 1310 combining the delay introduced by the programmable delay circuit 1214 and a driver and/or inverter 1216, and the reset delay ($t_{rst}$) 1312 corresponding to the delay between time of receipt of the rb signal 1228 by the pairs of D flipflops 1210a, 1210b, 1210c and time at which the flipflop outputs are cleared.

A loop delay ($t_{loop}$ 1320) may be defined as:

$$t_{loop} = t_{ck2q} + t_{OR\_1} + t_{pgm} + t_{rst} + t_{OR\_0} + t_{pgm}.$$

The relationship between $t_{loop}$ 1320 and the UI 1302 may determine the reliability of operation of the CDR circuit 1200. This relationship is affected by clock frequency used for transmission, which has a direct effect on the UI 1302, and variability in the operation of the programmable delay circuit 1214.

In some devices, the operation of the programmable delay circuit 1214 can be afflicted by variations in operating conditions, including variations in manufacturing process, circuit supply voltage, and die temperature (PVT) conditions. The delay time provided by the programmable delay circuit 1214 for a configured value may vary significantly from device to device, and/or from circuit to circuit within a device. In conventional systems, the nominal operating condition of the CDR circuit 1200 is generally set by design to generate a clock edge somewhere in the middle of the eye opening 1106 under all PVT conditions, in order to ensure that a clock edge occurs after the end 1112 of the signal transition region 1104 and prior to the commencement of the transition region to the next symbol, even under worst case PVT effects. Difficulty can arise in designing a CDR circuit 1200 that guarantees a clock edge within the eye opening 1106 when the transmission frequency increases and timing skew of the difference signals 1202, 1204, 1206 is large compared to the UI 1302. For example, a typical delay circuit may produce a delay value that changes by a factor of 2 over all PVT conditions.

Figure 14:
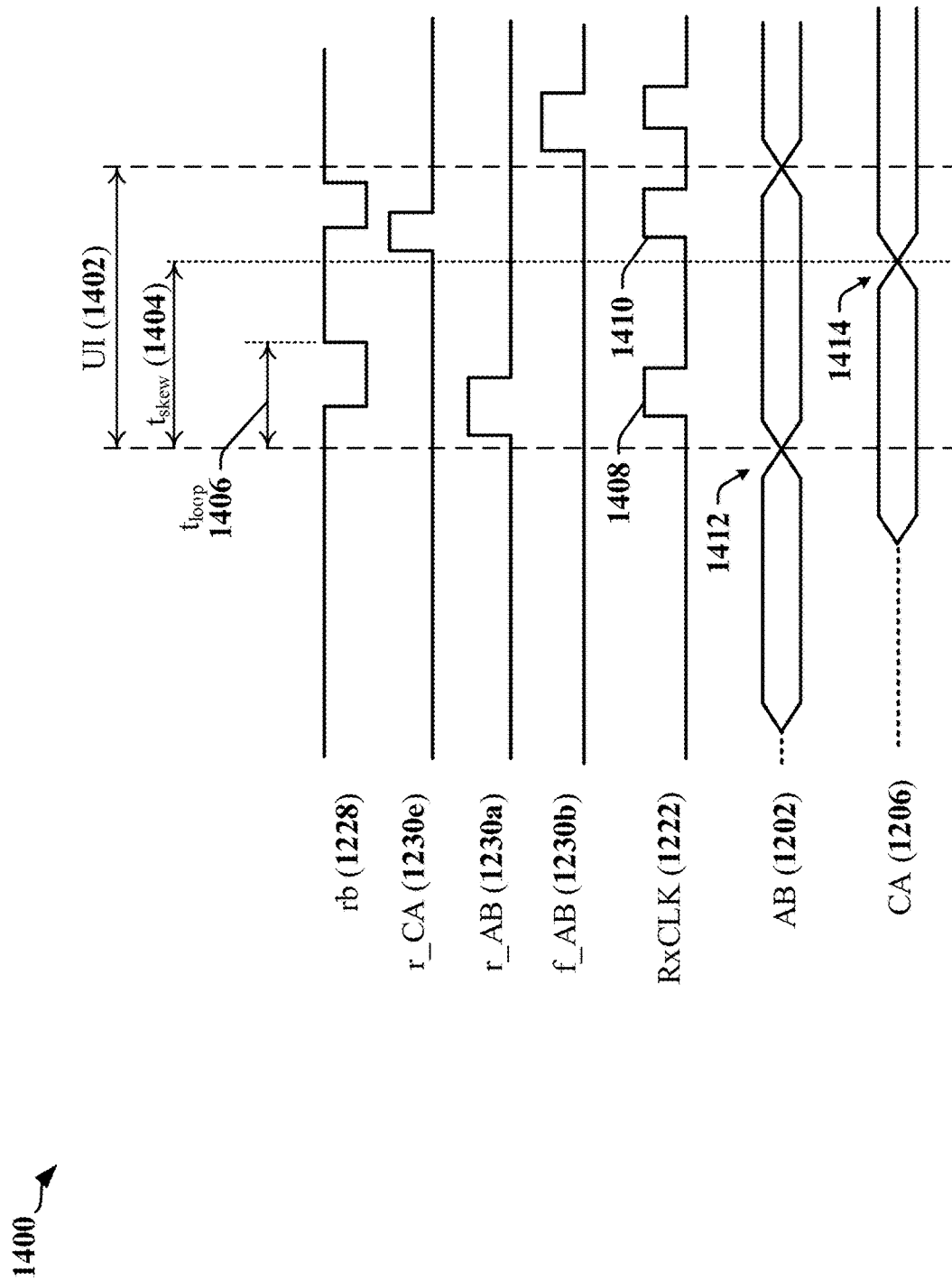
FIG. 14 illustrates timing associated with a CDR circuit that has a loop time that is shorter than the skew between signals transmitted on the C-PHY 3-Phase signal.

FIG. 14 is a timing diagram 1400 that illustrates the effect of a programmable delay circuit 1214 that provides an insufficient delay. In this example, $t_{loop}$ 1406 is too short for the observed $t_{skew}$ 1404, and multiple clock pulses 1408, 1410 are generated in one UI 1402. That is, the loop delay $t_{loop}$ 1406 is not big enough relative to $t_{skew}$ 1404, and later occurring transitions on the difference signals 1202, 1204, 1206 are not masked. In the depicted example, a second transition 1414 in one of the difference signals 1206 may be detected after a pulse 1408 has been generated in response to a first occurring transition 1412 in another of the difference signals 1202. In this example, the recovered clock frequency may be twice the clock frequency used to transmit symbols on the 3-phase interface.

Figure 15:
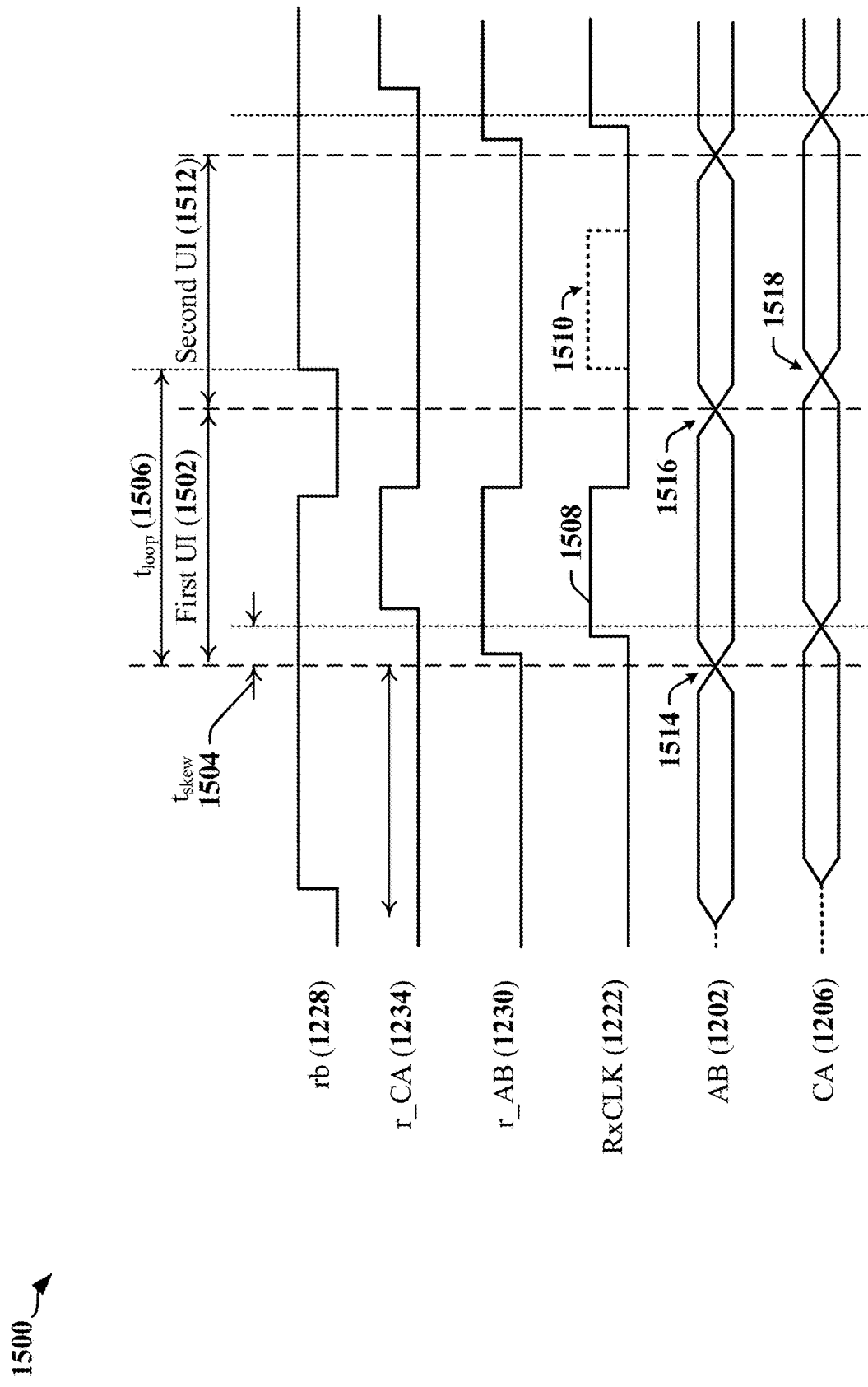
FIG. 15 illustrates timing associated with a CDR circuit that has a loop time that is longer than a symbol interval of the C-PHY 3-Phase signal.

FIG. 15 is a timing diagram 1500 that illustrates the effect of a programmable delay circuit 1214 that provides a delay that is too long. In this example, there is an observed skew of duration $t_{skew}$ 1504 and $t_{loop}$ 1506 is greater than the UI 1502. The CDR circuit 1200 may generate a clock pulse 1508 in response to a first-occurring transition 1514 in a first UI 1502, but the rb signal 1228 may be active when transitions 1516, 1518 occur in a second UI 1512, In the example depicted, the transitions 1516, 1518 in the second UI 1512 are masked, and the expected pulse 1510 corresponding to the second UI 1512 is suppressed. In this example, the recovered clock frequency may be half the clock frequency used to transmit symbols on the 3-phase interface.

As illustrated by the examples of FIGS. 14 and 15, the CDR circuit 1200 may be subject to the constraint:

$$t_{skew} < t_{loop} < UI.$$

Empirical evidence suggests that $t_{loop}$ 1320, 1406, 1506 is very sensitive to PVT. $t_{loop}$ 1320 for the CDR circuit 1200 may be restated as:

$$t_{loop} = t_{ck2q} + t_{OR\_1} + t_{rst} + t_{OR\_0} + (t_{pgm} + t_{pgm}).$$

The loop time is susceptible to reliability at higher symbol rates due to the large number of delays that are sensitive to PVT variations, the double $t_{pgm}$ delay and the large delay associated with the 6-input OR gate 1212 can limit the maximum frequency of a clock signal recoverable by the CDR circuit 1200. Increasing the delay provided by the programmable delay circuit 1214 to accommodate the range of potential variations of PVT serves to further limit the maximum frequency of the clock signal recoverable by the CDR circuit 1200.

More recent implementations and proposed specifications for C-PHY, including the C-PHY 1.2 specifications and C-PHY 2.0 specifications, define frequencies of symbol transmission clock signals that can exceed the capabilities of conventional CDR circuits to recover a clock signal at the receiver. The symbol transmission clock signal is used to control the rate of symbol transmission and determines the duration of the UI 1302. The duration of the UI 1302 is reduced when the frequency of the symbol transmission clock signal is increased. Constraints introduced by the loop delay in the CDR circuit 1200 limit the minimum duration of the UI 1302 that can be supported by the CDR circuit 1200, which limits the maximum frequency of the symbol transmission clock signal that can be supported by the CDR circuit 1200. Even using advanced device technology, the loop delay in the CDR circuit 1200 can exceed 300 picoseconds under certain PVT conditions, which can limit conventional C-PHY applications to a maximum symbol transmission rate of 2.5 Gigasymbols per second. In some implementations, the constraint on the duration of the UI 1302 introduced by the loop delay in the CDR circuit 1200 can render the conventional CDR circuit 1200 ineffective for use in C-PHY interfaces that are to conform to later generations of C-PHY specifications.

The ability to increase the frequency of the symbol transmission clock may be limited by the capabilities of circuits in C-PHY transmitters and receivers. In many implementations, switching times defined for logic gates may limit the maximum frequency of the symbol transmission clock, and/or may limit the number of levels of gates in circuits used to transmit or receive symbols at higher clock frequencies. In one example, propagation time through logic circuits of a receiver circuit can constrain the minimum UI that can be supported by the receiver, and/or the window of time during which a symbol can be reliably sampled. In another example, the generation and distribution of a high-speed symbol transmission clock signal may be difficult to accomplish and/or may complicate integrated circuit design.

In accordance with certain aspects of this disclosure, increased and/or maximized symbol transmission rates may be accomplished using half-rate symbol transmission clocks. A conventional C-PHY data path operates using a full-rate symbol transmission clock, whereby data is transmitted and sampled on a single type of edge of the transmitter's symbol clock signal or receiver's symbol clock signal respectively. The type of edge used for timing in a symbol clock signal may be the rising edge or the falling edge, based on the circuit design employed in an implementation. Data throughput is determined by the symbol rate of the C-PHY interface, where symbol rate may be expressed as the number of symbols transmitted per second over the C-PHY bus. According to conventional C-PHY specifications:

$$\text{Symbol rate} = \text{Symbol clock frequency}.$$

Data throughput may be measured as the number of bits per second transmitted over the C-PHY bus. In one example, approximately 2.32 bits can be encoded in the transitions between consecutively-transmitted symbols, such that:

$$\text{Data throughput} = 2.32 * (\text{Symbol clock frequency}).$$

A C-PHY interface implemented in accordance with certain aspects of this disclosure can increase data throughput of a C-PHY interface by using half-rate symbol clock signal to control timing in a C-PHY data path. In one example, a transmitter can transmit symbols on rising edges and falling edges of the symbol transmission clock signal. In another example, a receiver can generate a half-rate symbol clock signal that is half the frequency of the symbol transmission clock signal, and can use rising edges and falling edges of the generated clock signal to capture symbols transmitted through the C-PHY interface. The use of a half-rate symbol clock signal in accordance with certain aspects of this disclosure provides that:

$$\text{Symbol rate} = 2 * (\text{Symbol clock frequency}).$$

Data throughput is measured as the number of bits per second transmitted over the C-PHY bus. When 2.32 bits are encoded in the transitions between consecutively-transmitted symbols:

$$\text{Data throughput} = 4.64 * (\text{Symbol clock frequency}).$$

In one example, the data throughput obtained using a 10 GHz full-rate symbol clock signal in a conventional C-PHY interface can be obtained using a 5 GHz half-rate symbol clock signal in a C-PHY interface implemented in accordance with certain aspects of this disclosure.

Figure 16:
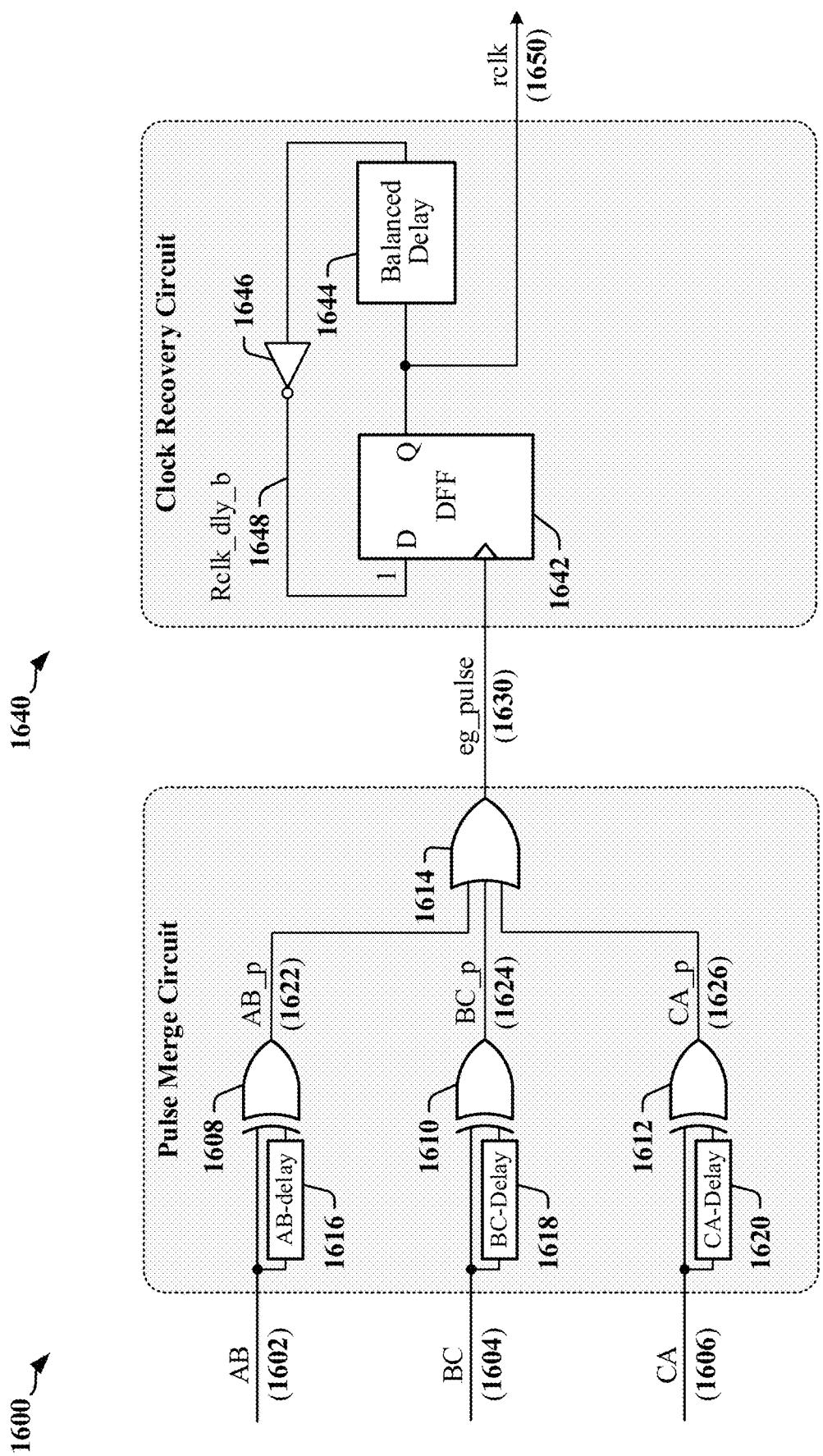
FIG. 16 illustrates a CDR circuit provided in accordance with certain aspects of this disclosure.
Figure 17:
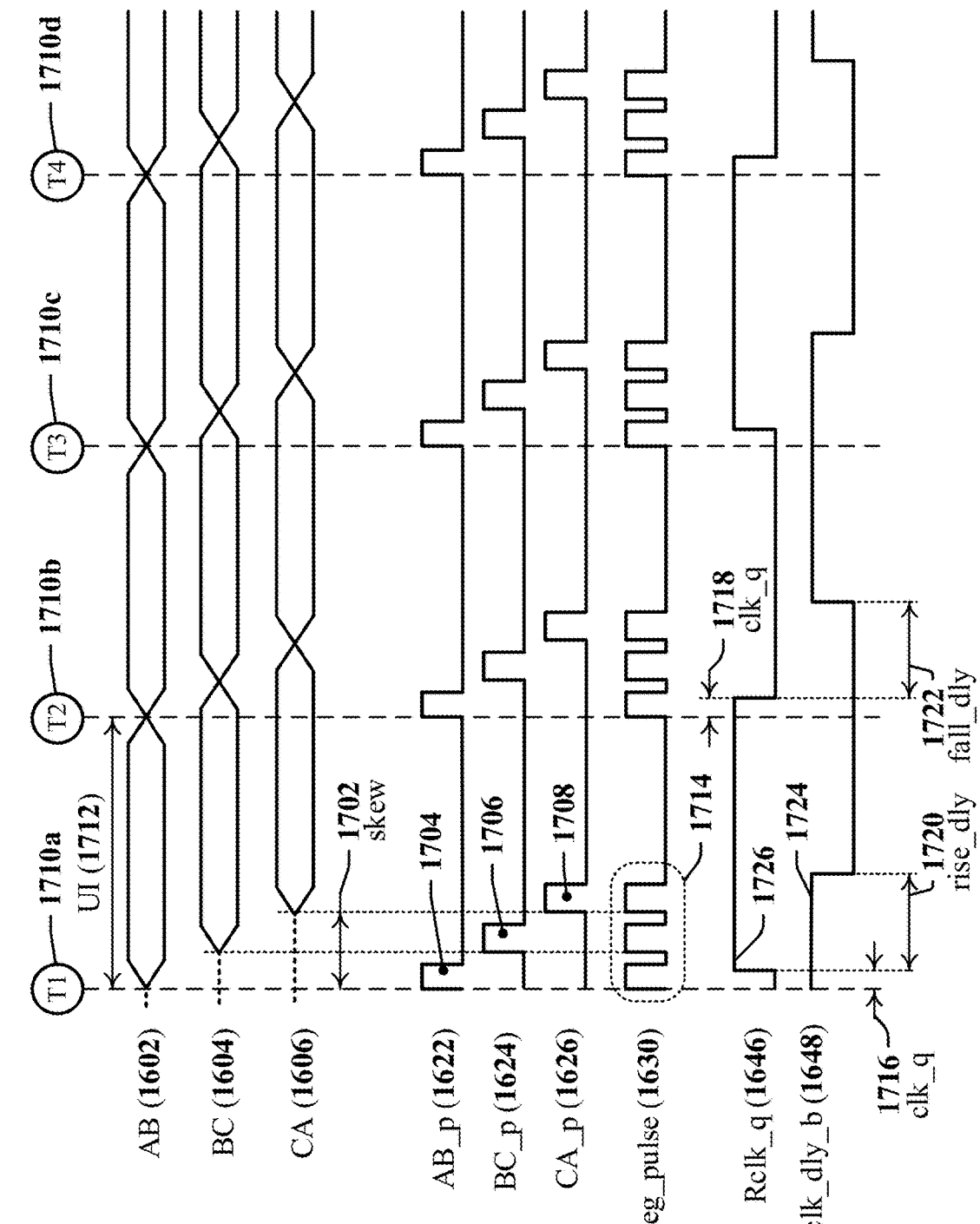
FIG. 17 illustrates timing associated with the CDR circuit illustrated in FIG. 16.

FIG. 16 illustrates a clock recovery circuit 1640 that is configured to provide a half-rate symbol clock signal 1650 from signaling transmitted through a C-PHY interface. Multiple delay circuits 1616, 1618, 1620, 1644 are used to mask variations in transition times in the difference signals 1602, 1604, 1606. The delay circuits 1616, 1618, 1620 are provided in a pulse merge circuit 1600 that generates, and merges transition pulses representative of transitions detected in the difference signals 1602, 1604, 1606. FIG. 17 is a timing diagram 1700 that illustrates timing associated with the pulse merge circuit 1600 and clock recovery circuit 1640.

The pulse merge circuit 1600 receives difference signals 1602, 1604, 1606 that represent differences in signaling state of pairs of wires the trio of wires A, B and C. The difference signals 1602, 1604, 1606 may be received from differential receivers or comparators such as differential receivers 802a, 802b and 802c that produce the difference signals 810a, 810b, 810c illustrated in FIG. 8. The pulse merge circuit 1600 uses three exclusive-OR gates 1608, 1610, 1612 and corresponding delay circuits 1616, 1618 and 1620 to generate transition pulses 1704, 1706, 1708 in response to transitions occurring in the difference signals 1602, 1604, 1606. In the example of the illustrated timing diagram 1700, a transition in the AB difference signal 1602, the BC difference signal 1604 and the CA difference signal 1606 occurs at the each of the illustrated symbol boundaries 1710a, 1710b, 1710c, 1710d. The transitions in the difference signals 1602, 1604, 1606 can occur at different times, such that a skew 1702 can be observed between the first-occurring transition and the last-occurring transition. In the illustrated example, the first-occurring transition is observed at the first illustrated symbol boundary 1710a on the AB difference signal 1602 and the last-occurring transition at the first illustrated symbol boundary 1710a is observed on the CA difference signal 1606. The relationship between transitions can be different at each symbol boundary 1710a, 1710b, 1710c, 1710d. In operation, a transition may not occur on one of the difference signals 1602, 1604, 1606 at one or more symbol boundaries 1710a, 1710b, 1710c, 1710d.

A first exclusive-OR gate 1608 receives the AB difference signal 1602 and a delayed version of the AB difference signal 1602 provided by the AB-delay circuit 1616, and provides an AB_p signal 1622 that includes a pulse 1704 that has a duration controlled by the duration of delay introduced by the AB-delay circuit 1616. A second exclusive-OR gate 1610 receives the BC difference signal 1604 and a delayed version of the BC difference signal 1604 provided by the BC-delay circuit 1618, and provides a BC_p signal 1624 that includes a pulse 1706 that has a duration controlled by the duration of delay introduced by the BC-delay circuit 1618. A third exclusive-OR gate 1612 receives the CA difference signal 1606 and a delayed version of the CA difference signal 1606 provided by the CA-delay circuit 1620, and provides a CA_p signal 1626 that includes a pulse 1708 that has a duration controlled by the duration of delay introduced by the CA-delay circuit 1620. The AB_p signal 1622, the BC_p signal 1624 and the CA_p signal 1626 are provided to an OR-gate 1614 that provides an eg_pulse signal 1630 that includes combined pulses 1714 corresponding to the pulses 1704, 1706, 1708 in the AB_p signal 1622, the BC_p signal 1624 and the CA_p signal 1626. In some instances, two or more of the pulses 1704, 1706, 1708 may overlap in time and may be merged in the combined pulses 1714.

The eg_pulse signal 1630 clocks a delay flipflop (DFF 1642) in the clock recovery circuit 1640. Each rising edge in the eg_pulse signal 1630 clocks an inverted, delayed half-rate symbol clock signal 1648 from the D input through to the output (Q) of the DFF 1642. The output of the DFF 1642 provides the half-rate symbol clock signal 1650 (rclk). The delay circuits 1616, 1618 and 1620 may be configured to provide pulses 1704, 1706, 1708 that have a duration sufficient to clock the DFF 1642 under expected or observed PVT conditions. For example, the duration of the pulses 1704, 1706, 1708 may be configured based on a minimum duration for a clock pulse.

The clock recovery circuit 1640 is configured to provide a half-rate symbol clock signal 1650 that changes state at each symbol boundary 1710a, 1710b, 1710c, 1710d. For example, the inverted, delayed half-rate symbol clock signal 1648 is in a logic 1 state at the first symbol boundary 1710a, while the half-rate symbol clock signal 1650 is at logic 0. The first rising edge in the combined pulses 1714, which corresponds to the first difference pulse 1704, clocks the logic 1 level through to the Q output of the DFF 1642, causing the half-rate symbol clock signal 1650 to transition to the logic 1 state. A combination of a delay circuit 1644 and an inverter 1646 delay the transition in the half-rate symbol clock signal 1650 and cause the inverted, delayed half-rate symbol clock signal 1648 to transition to the logic 0 state after a rise delay 1720. The duration of the rise delay 1720 is configured to mask additional edges in the eg_pulse signal 1630 such that difference pulses 1706, 1708 corresponding to the first symbol boundary 1710a have no effect on the state of the half-rate symbol clock signal 1650.

The first rising edge in the combined pulses corresponding to the second symbol boundary 1710b clocks the logic 0 level of the inverted, delayed half-rate symbol clock signal 1648 through to the Q output of the DFF 1642, causing the half-rate symbol clock signal 1650 to transition to the logic 0 state. The duration of a fall delay 1722 is configured to mask additional edges in the eg_pulse signal 1630 such that difference pulses corresponding to the second symbol boundary 1710b have no effect on the state of the half-rate symbol clock signal 1650. The delay circuit 1644 is configured to provide matching durations of the rise delay 1720 and the fall delay 1722. Configuration of the delay circuit 1644 is constrained by the need to match the durations of the rise delay 1720 and the fall delay 1722 and to mask additional pulses at symbol boundaries 1710a, 1710b, 1710c, 1710d.

The maximum frequency of operation of the Clock recovery circuit 1640 and the corresponding minimum UI may be determined by the timing constraints associated with the clock recovery circuit 1640 and the pulse merge circuit 1600. The timing constraints may be stated as:

$$clk\_q + rise\_dly > skew,$$

$$clk\_q + fall\_dly > skew,$$

$$clk\_q + rise\_dly + DFF\_setup < 1\,UI,$$

$$clk\_q + fall\_dly + DFF\_setup < 1\,UI,$$

$$rise\_dly = fall\_dly.$$

In many implementations, the matching rise_dly and fall_dly duration constraint requires duplicate delay cells and the intrinsic delay of the two delay cells can be quite large. In some instances, the delay cells in the delay circuit 1644 are associated with delay durations that cause the total delay to be large and unsuitable for newer C-PHY implementations.

Figure 18:
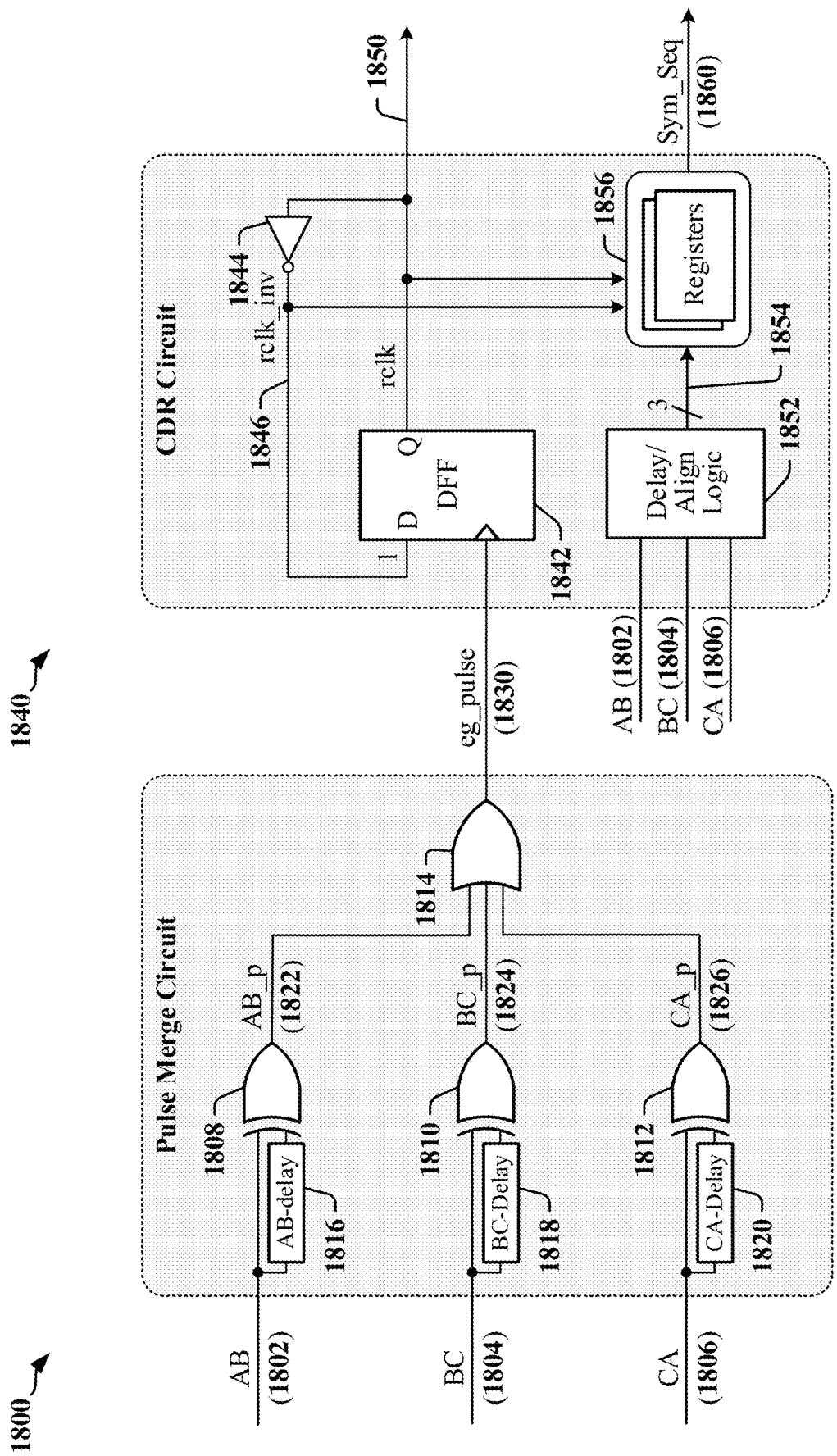
FIG. 18 illustrates an example of a rising-edge delay circuit that may be used in accordance with certain aspects disclosed herein.
Figure 19:
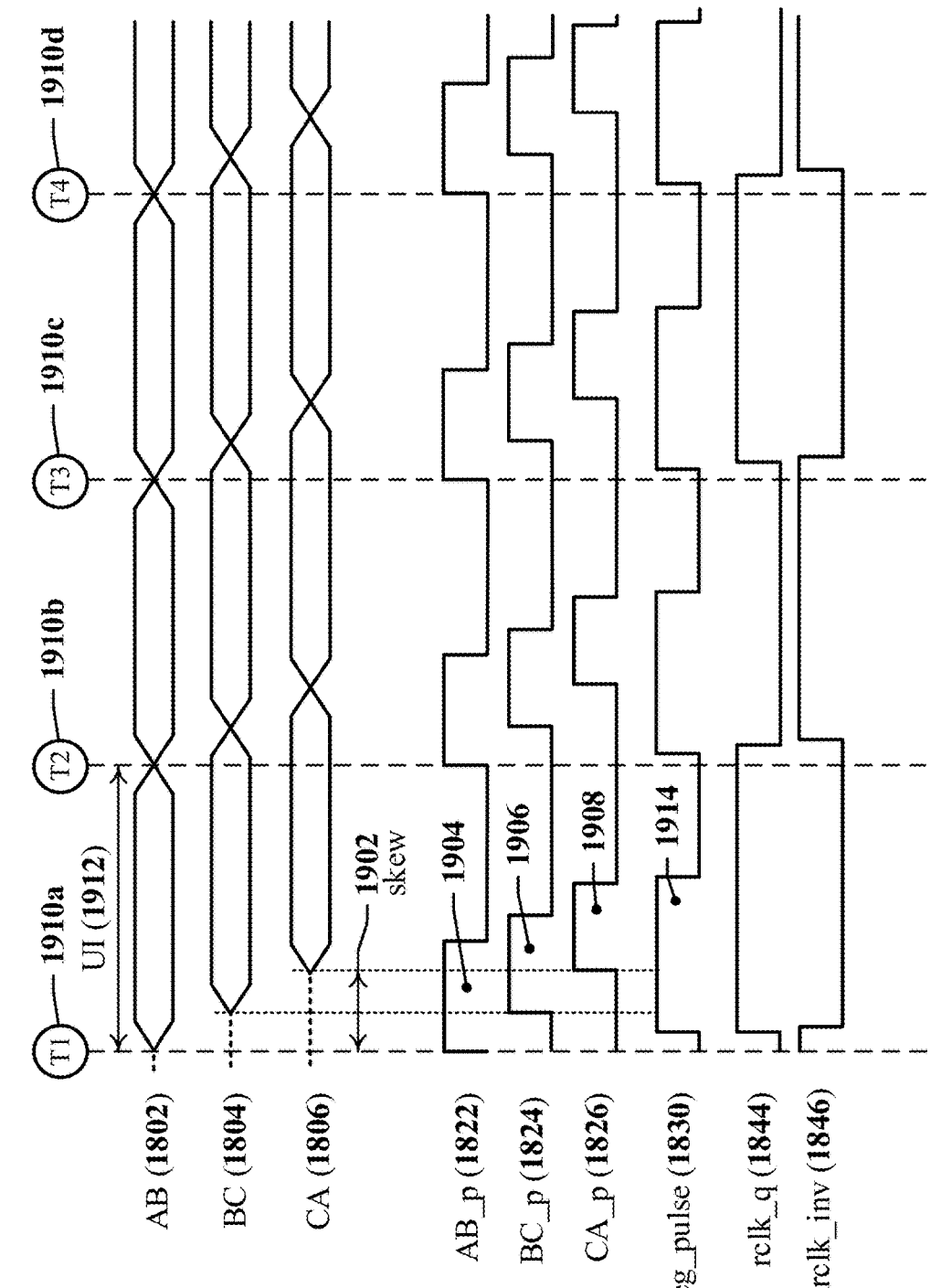
FIG. 19 illustrates timing associated with the rising-edge delay circuit illustrated in FIG. 18.

FIG. 18 illustrates a CDR circuit 1840 that is configured to provide a high-frequency half-rate symbol clock signal 1850 from signaling transmitted through a C-PHY interface. Delay circuits 1816, 1818, 1820 are provided in a pulse merge circuit 1800 that generates, and merges transition pulses representative of transitions detected in the difference signals 1802, 1804, 1806. FIG. 19 is a timing diagram 1900 that illustrates timing associated with the pulse merge circuit 1800 and the CDR circuit 1840.

The pulse merge circuit 1800 receives difference signals 1802, 1804, 1806 that represent differences in signaling state of pairs of wires the trio of wires A, B and C. The difference signals 1802, 1804, 1806 may be received from differential receivers or comparators such as differential receivers 802a, 802b and 802c that produce the difference signals 810a, 810b, 810c illustrated in FIG. 8. The pulse merge circuit 1800 uses three exclusive-OR gates 1808, 1810, 1812 and corresponding delay circuits 1816, 1818 and 1820 to generate transition pulses 1904, 1906, 1908 in response to transitions occurring in the difference signals 1802, 1804, 1806. In the example of the illustrated timing diagram 1900, a transition in the AB difference signal 1802, the BC difference signal 1804 and the CA difference signal 1806 occurs at the each of the illustrated symbol boundaries 1910a, 1910b, 1910c, 1910d.

The transitions in the difference signals 1802, 1804, 1806 can occur at different times, such that a timing skew 1902 can be observed between the first-occurring transition and the last-occurring transition. In the illustrated example, the first-occurring transition is observed at the first illustrated symbol boundary 1910a on the AB difference signal 1802 and the last-occurring transition at the first illustrated symbol boundary 1910a is observed on the CA difference signal 1806. The relationship between transitions can be different at each symbol boundary 1910a, 1910b, 1910c, 1910d. In operation, a transition may not occur on one of the difference signals 1802, 1804, 1806 at one or more symbol boundaries 1910a, 1910b, 1910c, 1910d.

A first exclusive-OR gate 1808 receives the AB difference signal 1802 and a delayed version of the AB difference signal 1802 provided by the AB-delay circuit 1816, and provides an AB_p signal 1822 that includes a pulse 1904 that has a duration controlled by the duration of delay introduced by the AB-delay circuit 1816. A second exclusive-OR gate 1810 receives the BC difference signal 1804 and a delayed version of the BC difference signal 1804 provided by the BC-delay circuit 1818, and provides a BC_p signal 1824 that includes a pulse 1906 that has a duration controlled by the duration of delay introduced by the BC-delay circuit 1818. A third exclusive-OR gate 1812 receives the CA difference signal 1806 and a delayed version of the CA difference signal 1806 provided by the CA-delay circuit 1820, and provides a CA_p signal 1826 that includes a pulse 1908 that has a duration controlled by the duration of delay introduced by the CA-delay circuit 1820. The AB_p signal 1822, the BC_p signal 1824 and the CA_p signal 1826 are provided to an OR-gate 1814 that provides an eg_pulse signal 1830.

Each of the delay circuits 1816, 1818, 1820 may be configured and/or calibrated to provide a delay that exceeds the duration of the timing skew 1902 measured with respect to a corresponding difference signal 1802, 1804, 1806. For example, the duration of the delay provided by the AB-delay circuit 1816 may be configured or adjusted to exceed the duration of the timing skew 1902 between transitions in the AB difference signal 1802 and transitions in the BC difference signal 1804 and/or the CA difference signal 1806. The resultant pulses 1904, 1906 and/or 1908 overlap such that the OR-gate 1814 provides a combined pulse 1914 in the eg_pulse signal 1830 for each symbol boundary 1910a, 1910b, 1910c, 1910d. The delay circuits 1816, 1818, 1820 may be reconfigured and/or recalibrated to accommodate timing and other variations associated with variances in PVT conditions.

The eg_pulse signal 1830 clocks a delay flipflop (DFF 1842) in the CDR circuit 1840. Each rising edge in the eg_pulse signal 1830 clocks an inverted version (rclk_inv signal 1846) of the half-rate symbol clock signal 1850 (rclk) from the D input through to the output (Q) of the DFF 1842. The output of the DFF 1842 provides the half-rate symbol clock signal 1850. The delay circuits 1816, 1818 and 1820 may be configured to provide pulses 1904, 1906, 1908 that have a minimum duration that is sufficient to exceed the duration of the skew 1702 for expected or measured PVT conditions.

The CDR circuit 1840 is configured to provide a half-rate symbol clock signal 1850 that changes state at each symbol boundary 1910a, 1910b, 1910c, 1910d. For example, the rclk_inv signal 1846 is in the logic 1 state at the first symbol boundary 1910a, while the half-rate symbol clock signal 1850 is at the logic 0 state. The rising edge of the combined pulse 1914 in the eg_pulse signal 1830 clocks the logic 1 level through to the Q output of the DFF 1842, causing the half-rate symbol clock signal 1850 to transition to the logic 1 state. The inverter 1844 generates the rclk_inv signal 1846 from the half-rate symbol clock signal 1850 with minimal delay.

The delay mask used to accommodate skew between difference signals 1802, 1804, 1806 is provided in the pulse merge circuit 1800, and is external to the CDR circuit 1840. Accordingly, the CDR circuit 1840 is effectively an open-loop circuit that can switch very quickly in response to an edge in a signal provided to its clock signal. The maximum frequency of operation of the CDR circuit 1840 and the corresponding minimum UI may be determined by the timing constraints:

$$\text{dly} > \text{skew, and}$$

$$\text{dly+skew} < 1UI$$

where dly represents the duration of the maximum delay provided by the delay circuits 1816, 1818 and 1820.

The CDR circuit 1840 may include or be coupled to one or more circuits used to decode data encoded in the signals transmitted over a three wire bus in accordance with C-PHY protocols. For example, the half-rate symbol clock signal 1850 may be used to control the capture of symbols representative of the three difference signals 1802, 1804, 1806 at each symbol boundary 1910a, 1910b, 1910c, 1910d. In one example, raw symbols that define the state of the three difference signals 1802, 1804, 1806 may be captured. In another example, FRP symbols may be generated and captured based on the state of the three difference signals 1802, 1804, 1806.

In the illustrated example, the CDR circuit 1840 includes timing circuits that may be used to delay or otherwise align the difference signals 1802, 1804, 1806 to enable capture at an edge of the half-rate symbol clock signal 1850 or a derivative of the half-rate symbol clock signal 1850. Aligned difference signals may be used to generate a symbol stream 1854 of three-bit raw symbols to a set of registers 1856 that are configured to capture the raw symbols from the symbol stream 1854 on both the rising edge and falling edge of the half-rate symbol clock signal 1850. In one example, the set of registers 1856 may include first registers that capture symbols from the symbol stream 1854 based on timing derived from rising edges in the half-rate symbol clock signal 1850 and second registers that capture symbols from the symbol stream 1854 based on timing derived from rising edges in the rclk_inv signal 1846. The set of registers 1856 may include one or more 3-bit shift registers and/or may be organized as a first-in, first-out (FIFO) buffer that provides a sequence of symbols 1860 that have been assembled from different registers in the set of registers 1856.

Examples of Processing Circuits and Methods

Figure 20:
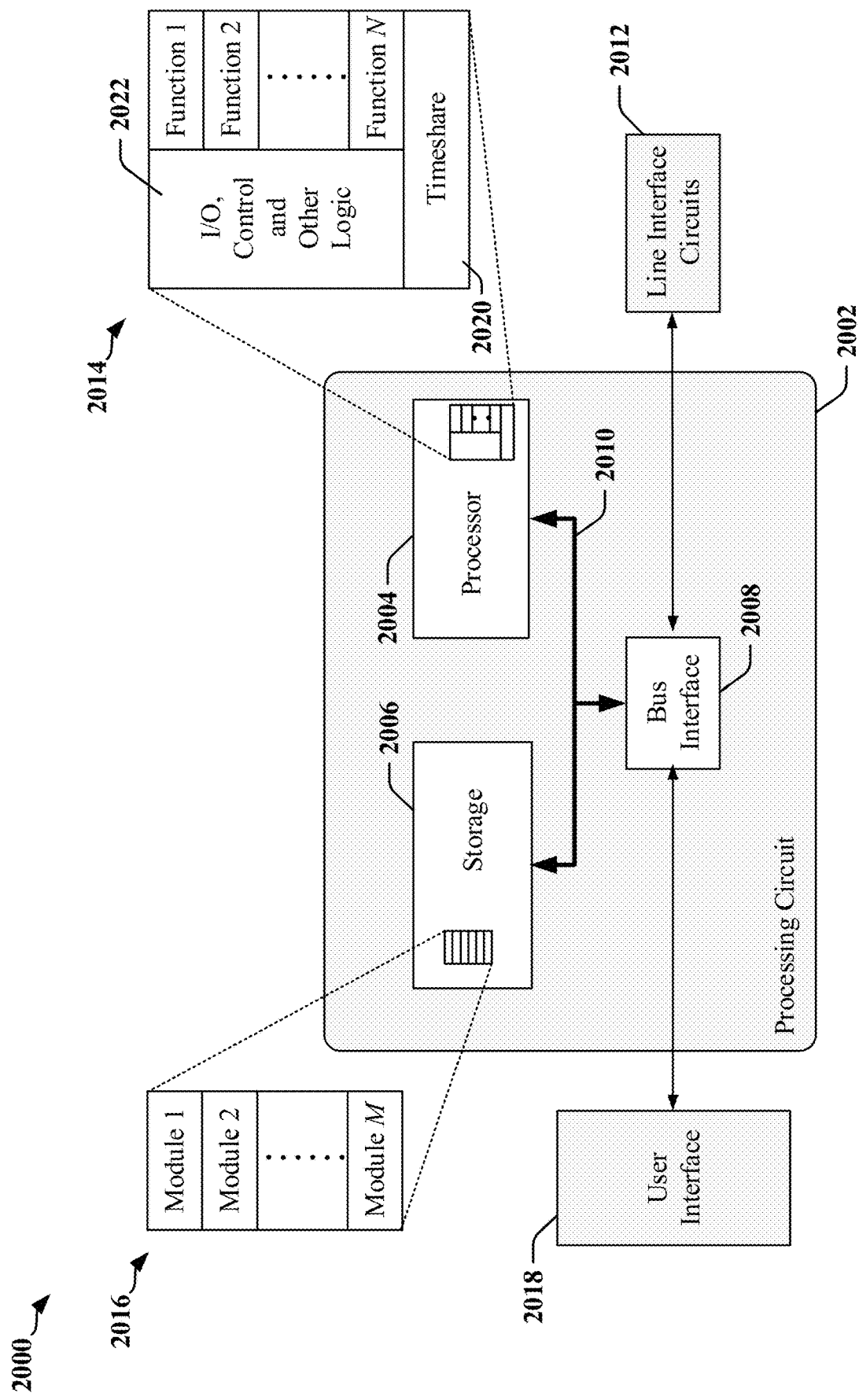
FIG. 20 is a block diagram illustrating an example of an apparatus employing a processing circuit that may be adapted according to certain aspects disclosed herein.

FIG. 20 illustrates an example of a hardware implementation for an apparatus 2000 employing a processing circuit 2002 that may be configured to perform one or more functions disclosed herein. In accordance with various aspects of the disclosure, an element, or any portion of an element, or any combination of elements as disclosed herein may be implemented using the processing circuit 2002. The processing circuit 2002 may include certain devices, circuits, and/or logic that support clock recovery techniques disclosed herein.

The processing circuit 2002 may include one or more processors 2004 that are controlled by some combination of hardware and software modules. Examples of processors 2004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2004 may include specialized processors that perform specific functions, and that may be configured, augmented or controlled by one of the software modules 2016. The one or more processors 2004 may be configured through a combination of software modules 2016 loaded during initialization, and further configured by loading or unloading one or more software modules 2016 during operation.

In the illustrated example, the processing circuit 2002 may be implemented with a bus architecture, represented generally by the bus 2010. The bus 2010 may include any number of interconnecting buses and bridges depending on the specific application of the processing circuit 2002 and the overall design constraints. In one example, the bus 2010 links together various circuits including the one or more processors 2004 and a processor-readable storage medium 2006. The processor-readable storage medium 2006 may include memory devices and mass storage devices, and may be referred to herein as computer-readable media and/or processor-readable media. The bus 2010 may also link various other circuits such as timing sources, timers, peripherals, voltage regulators, and power management circuits. A bus interface 2008 may provide an interface between the bus 2010 and one or more transceivers 2012. A transceiver 2012 may be provided for each networking technology supported by the processing circuit. In some instances, multiple networking technologies may share some or all of the circuitry or processing modules found in a transceiver 2012. Each transceiver 2012 provides a means for communicating with various other apparatus over a transmission medium. Depending upon the nature of the apparatus 2000, a user interface 2018 (e.g., keypad, display, speaker, microphone, joystick) may also be provided, and may be communicatively coupled to the bus 2010 directly or through the bus interface 2008.

A processor 2004 may be responsible for managing the bus 2010 and for general processing that may include the execution of software stored in a computer-readable medium, which may include the processor-readable storage medium 2006. In this respect, the processing circuit 2002, including the processor 2004, may be used to implement any of the methods, functions and techniques disclosed herein. The processor-readable storage medium 2006 may be used for storing data that is manipulated by the processor 2004 when executing software, and the software may be configured to implement any one of the methods disclosed herein.

One or more processors 2004 in the processing circuit 2002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the processor-readable storage medium 2006 or in another external processor-readable medium. The processor-readable storage medium 2006 may include a non-transitory computer-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The processor-readable storage medium 2006 may also include, by way of example, a carrier wave, a transmission line, and any other suitable medium for transmitting software and/or instructions that may be accessed and read by a computer. The processor-readable storage medium 2006 may reside in the processing circuit 2002, in the processor 2004, external to the processing circuit 2002, or be distributed across multiple entities including the processing circuit 2002. The processor-readable storage medium 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The processor-readable storage medium 2006 may maintain software maintained and/or organized in loadable code segments, modules, applications, programs, etc., which may be referred to herein as software modules 2016. Each of the software modules 2016 may include instructions and data that, when installed or loaded on the processing circuit 2002 and executed by the one or more processors 2004, contribute to a run-time image 2014 that controls the operation of the one or more processors 2004. When executed, certain instructions may cause the processing circuit 2002 to perform functions in accordance with certain methods, algorithms and processes described herein.

Some of the software modules 2016 may be loaded during initialization of the processing circuit 2002, and these software modules 2016 may configure the processing circuit 2002 to enable performance of the various functions disclosed herein. For example, some software modules 2016 may configure internal devices and/or logic circuits 2022 of the processor 2004, and may manage access to external devices such as the transceiver 2012, the bus interface 2008, the user interface 2018, timers, mathematical coprocessors, and so on. The software modules 2016 may include a control program and/or an operating system that interacts with interrupt handlers and device drivers, and that controls access to various resources provided by the processing circuit 2002. The resources may include memory, processing time, access to the transceiver 2012, the user interface 2018, and so on.

One or more processors 2004 of the processing circuit 2002 may be multifunctional, whereby some of the software modules 2016 are loaded and configured to perform different functions or different instances of the same function. The one or more processors 2004 may additionally be adapted to manage background tasks initiated in response to inputs from the user interface 2018, the transceiver 2012, and device drivers, for example. To support the performance of multiple functions, the one or more processors 2004 may be configured to provide a multitasking environment, whereby each of a plurality of functions is implemented as a set of tasks serviced by the one or more processors 2004 as needed or desired. In one example, the multitasking environment may be implemented using a timesharing program 2020 that passes control of a processor 2004 between different tasks, whereby each task returns control of the one or more processors 2004 to the timesharing program 2020 upon completion of any outstanding operations and/or in response to an input such as an interrupt. When a task has control of the one or more processors 2004, the processing circuit is effectively specialized for the purposes addressed by the function associated with the controlling task. The timesharing program 2020 may include an operating system, a main loop that transfers control on a round-robin basis, a function that allocates control of the one or more processors 2004 in accordance with a prioritization of the functions, and/or an interrupt driven main loop that responds to external events by providing control of the one or more processors 2004 to a handling function.

Figure 21:
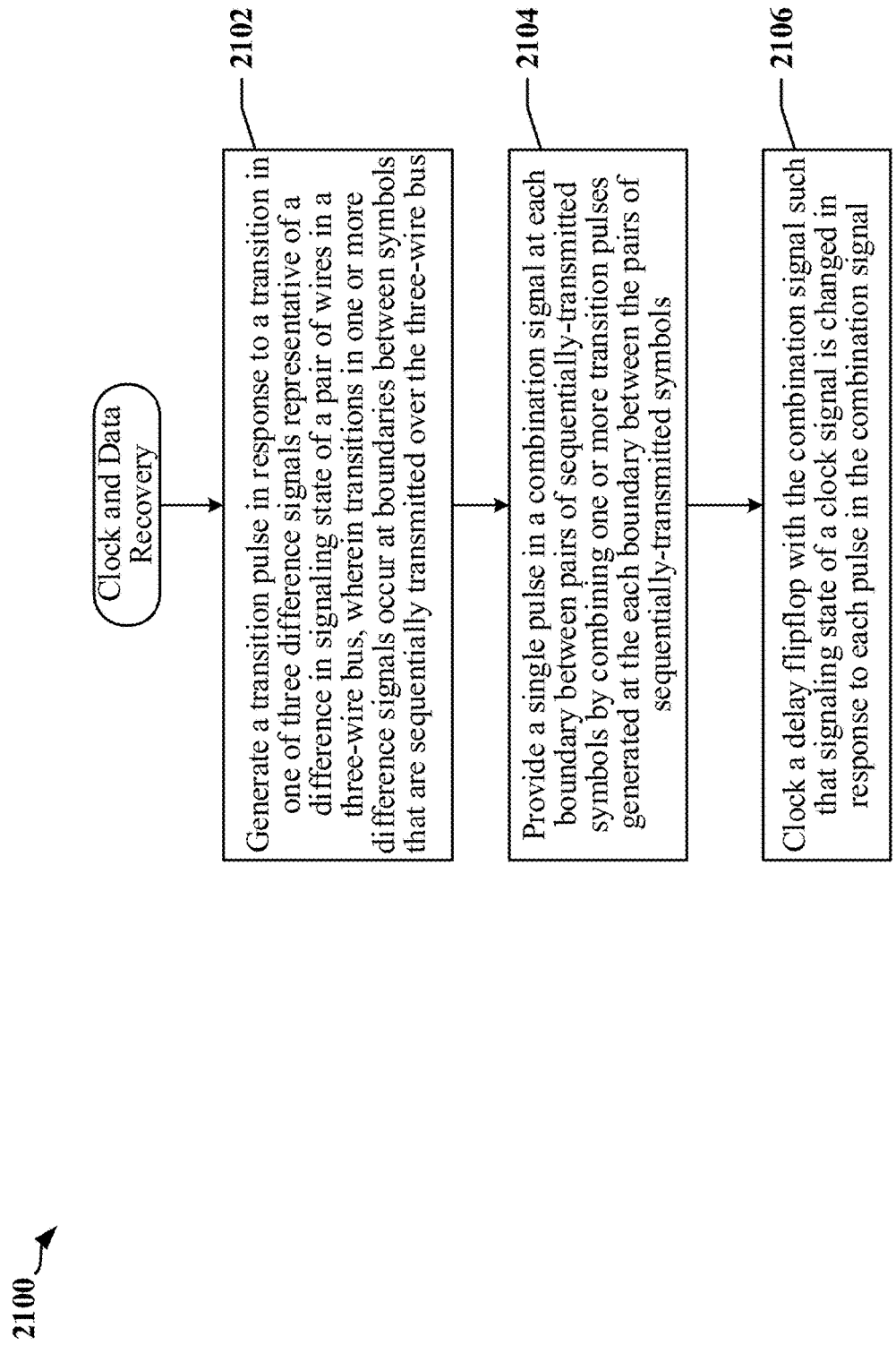
FIG. 21 is a flowchart of a first method of calibration according to certain aspects disclosed herein.

FIG. 21 is a flowchart 2100 of a clock recovery method that may be implemented at a receiving device coupled to a 3-wire C-PHY interface. At block 2102, the receiving device may generate a combination signal that includes one or more transition pulses. Each transition pulse is generated responsive to a transition in a difference signal representative of a difference in signaling state of a pair of wires in a three-wire bus. At block 2104, the receiving device may provide the combination signal to a delay flipflop that is configured to provide a clock signal as its output. The pulses in the combination signal cause the clock signal to be driven to a first state. At block 2106, the receiving device may provide a reset signal to the delay flipflop. The reset signal is derived from the clock signal by delaying transitions to the first state while passing transitions from the first state without added delay. The clock signal is driven from the first state when the reset signal transitions to the first state.

The receiving device may generate a transition pulse for a first difference signal by performing an exclusive OR-gate function on the first difference signal and a delayed version of the first difference signal. The receiving device may configure at least one pulse generating circuit to provide corresponding transition pulses with a duration based on a minimum clock pulse duration defined for the delay flipflop. The receiving device may calibrate at least one pulse generating circuit based on operating conditions of the three-wire bus. The receiving device may configure an asymmetric delay to provide a desired duration of delay applied to transitions to the first state. In one example, the asymmetric delay circuit is implemented as a rising-edge delay circuit configured to delay transitions from a low logic state to a high logic state. The rising-edge delay circuit may be further configured to pass transitions from the high logic state to the low logic state without added delay.

In various implementations, the clock signal may be provided to a wire state decoder configured to decode symbols from transitions in signaling state of the three-wire bus based on timing information provided in the clock signal.

Figure 22:
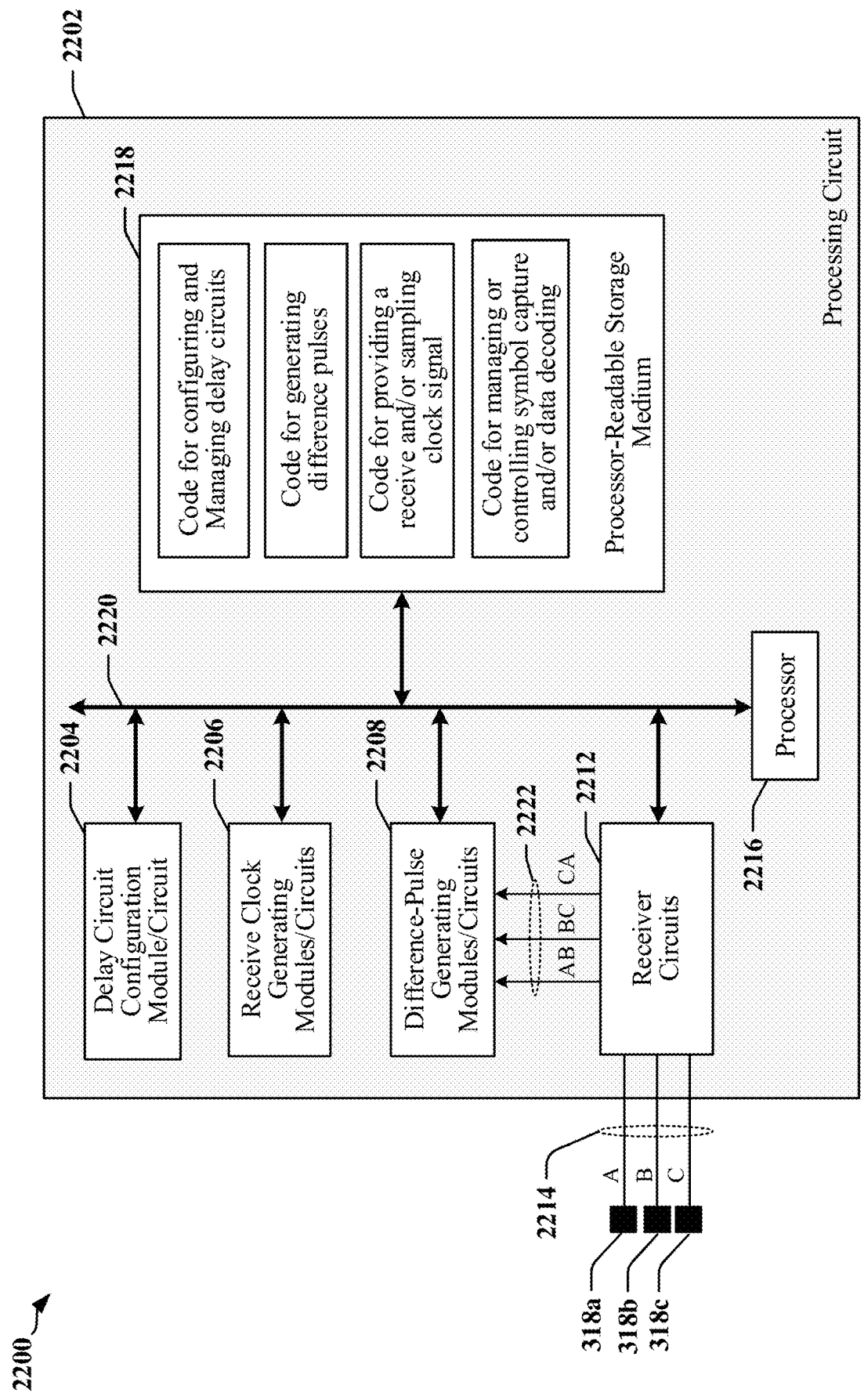
FIG. 22 is a diagram illustrating a first example of a hardware implementation for an apparatus employing a processing employing a processing circuit adapted according to certain aspects disclosed herein.

FIG. 22 is a diagram illustrating an example of a hardware implementation for an apparatus 2200 employing a processing circuit 2202. The processing circuit 2202 typically has at least one processor 2216 that may include one or more of a microprocessor, microcontroller, digital signal processor, a sequencer and a state machine. The processing circuit 2202 may be implemented with a bus architecture, represented generally by the bus 2220. The bus 2220 may include any number of interconnecting buses and bridges depending on the specific application of the processing circuit 2202 and the overall design constraints. The bus 2220 links together various circuits including one or more processors and/or hardware modules, represented by the processor 2216, the modules or circuits 2204, 2206 and 2208, difference receiver circuits 2212 that generate difference signals 2222 representative of differences in signaling state between different pairs of the connectors or wires 2214 and the processor-readable storage medium 2218. The bus 2220 may also link various other circuits such as timing sources, peripherals, voltage regulators, and power management circuits, which are well known in the art, and therefore, will not be described any further.

The processor 2216 is responsible for general processing, including the execution of software stored on the processor-readable storage medium 2218. The software, when executed by the processor 2216, causes the processing circuit 2202 to perform the various functions described supra for any particular apparatus. The processor-readable storage medium 2218 may also be used for storing data that is manipulated by the processor 2216 when executing software, including data decoded from symbols transmitted over the connectors or wires 2214, which may be configured as a C-PHY bus. The processing circuit 2202 further includes at least one of the modules 2204, 2206 and 2208. The modules 2204, 2206 and 2208 may be software modules running in the processor 2216, resident/stored in the processor-readable storage medium 2218, one or more hardware modules coupled to the processor 2216, or some combination thereof. The modules 2204, 2206 and/or 2208 may include microcontroller instructions, state machine configuration parameters, or some combination thereof.

In one configuration, the apparatus 2200 may be configured for data communication in accordance with a C-PHY interface protocol. The apparatus 2200 may include modules and/or circuits 2208 configured to generate transition pulses responsive to transitions in signaling state of the difference signals 2222, modules and/or circuits 2206 that are configured to generate a clock signal useable to decode symbols from transitions in signaling state of the three-wire bus, and configuration modules and/or circuits 2204 for configuring delay durations used in generating the transition pulses and/or the receive clock.

In one example, the apparatus 2200 has a plurality of pulse generating circuits, a first logic circuit and a delay flipflop. Each of the pulse generating circuits is configured to generate a transition pulse in response to a transition in a difference signal 2222 that is representative of a difference in signaling state of a pair of wires in a three-wire bus. The first logic circuit is configured to provide a single pulse in a combination signal at each boundary between pairs of sequentially-transmitted symbols by combining one or more transition pulses received from the plurality of pulse generating circuits. The delay flipflop responds to each pulse in the combination signal by changing signaling state of a clock signal that is output by the clock recovery apparatus. The symbols may be sequentially transmitted over the three-wire bus in accordance with a C-PHY protocol.

Each pulse generating circuit may have a delay circuit configured to provide a delayed difference signal by delaying one of three difference signals, and a second logic circuit configured to provide the transition pulse by performing an exclusive OR function on the one of three difference signals and the delayed difference signal. The delay circuit may be configured to provide a delay that exceeds a duration of a skew between two of the three difference signals. The delay circuit may be configurable to provide a delay that accommodates variations in PVT conditions. The transition pulse may have a configurable duration. The delay flipflop may receive an inverse of the clock signal as its input. In one example, a rising edge in the clock signal can be used to capture a first symbol from the three-wire bus and a rising edge in the inverse of the clock signal can be used to capture a second symbol from the three-wire bus. In another example, a falling edge in the clock signal can be used to capture a first symbol from the three-wire bus and a falling edge in the inverse of the clock signal can be used to capture a second symbol from the three-wire bus. In another example, a rising edge in the clock signal can be used to capture a first symbol from the three-wire bus and a falling edge in the clock signal can be used to capture a second symbol from the three-wire bus.

The processor-readable storage medium 2218 may be a non-transitory storage medium and may store instructions and/or code that, when executed a processor 2216, cause the processing circuit 2202 to generate a transition pulse in response to a transition in one of three difference signals representative of a difference in signaling state of a pair of wires in a three-wire bus, provide a single pulse in a combination signal at each boundary between pairs of sequentially-transmitted symbols by combining one or more transition pulses generated at the each boundary between the pairs of sequentially-transmitted symbols, and clock a delay flipflop with the combination signal such that signaling state of a clock signal is changed in response to each pulse in the combination signal. Transitions in one or more difference signals can occur at boundaries between symbols that are sequentially transmitted over the three-wire bus.

In certain implementations, the instructions may cause the processing circuit 2202 to provide a delayed difference signal by delaying one of three difference signals, and perform an exclusive OR function on the one of three difference signals and the delayed difference signal to obtain the transition pulse. The instructions may cause the processing circuit 2202 to delay the one of three difference signals by a duration that exceeds a duration of a skew between two of the three difference signals. The instructions may cause the processing circuit 2202 to delay the one of three difference signals by a duration that accommodates variations in PVT conditions. The transition pulse can have a configurable duration. The instructions may cause the processing circuit 2202 to provide an inverse of the clock signal as an input to the delay flipflop, use a rising edge in the clock signal to capture a first symbol from the three-wire bus, and use a falling edge in the clock signal to capture a second symbol from the three-wire bus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A clock recovery apparatus comprising:
    a plurality of pulse generating circuits, each pulse generating circuit being configured to generate a transition pulse in response to a transition in one of three difference signals representative of a difference in signaling state of a pair of wires in a three-wire bus, wherein transitions in one or more difference signals occur at boundaries between symbols that are sequentially transmitted over the three-wire bus;
    a first logic circuit configured to provide a single pulse in a combination signal at each boundary between pairs of sequentially-transmitted symbols by combining one or more transition pulses received from the plurality of pulse generating circuits; and
    a delay flip flop configured to respond to each pulse in the combination signal by changing signaling state of a clock signal that is output by the clock recovery apparatus, wherein the delay flip flop receives an inverse of the clock signal as its input.

2. The clock recovery apparatus of claim 1, wherein each pulse generating circuit comprises:
    a delay circuit configured to provide a delayed difference signal by delaying one of three difference signals; and
    a second logic circuit configured to provide the transition pulse by performing an exclusive OR function on the one of three difference signals and the delayed difference signal.

3. The clock recovery apparatus of claim 1, wherein a rising edge in the clock signal is used to capture a first symbol from the three-wire bus and a rising edge in the inverse of the clock signal is used to capture a second symbol from the three-wire bus.

4. The clock recovery apparatus of claim 1, wherein a falling edge in the clock signal is used to capture a first symbol from the three-wire bus and a falling edge in the inverse of the clock signal is used to capture a second symbol from the three-wire bus.

5. The clock recovery apparatus of claim 1, wherein a rising edge in the clock signal is used to capture a first symbol from the three-wire bus and a falling edge in the clock signal is used to capture a second symbol from the three-wire bus.

6. The clock recovery apparatus of claim 1, wherein the symbols are sequentially transmitted over the three-wire bus in accordance with a C-PHY protocol.

7. A clock recovery apparatus, comprising:
    a plurality of pulse generating circuits, each pulse generating circuit being configured to generate a transition pulse in response to a transition in one of three difference signals representative of a difference in signaling state of a pair of wires in a three-wire bus, wherein transitions in one or more difference signals occur at boundaries between symbols that are sequentially transmitted over the three-wire bus;
    a first logic circuit configured to provide a single pulse in a combination signal at each boundary between pairs of sequentially-transmitted symbols by combining one or more transition pulses received from the plurality of pulse generating circuits; and
    a delay flip flop configured to respond to each pulse in the combination signal by changing signaling state of a clock signal that is output by the clock recovery apparatus, wherein each pulse generating circuit comprises a delay circuit configured to provide a delayed difference signal by delaying one of three difference signals, wherein the delay circuit is configured to provide a delay that exceeds a duration of a skew between two of the three difference signals, and a second logic circuit configured to provide the transition pulse by performing an exclusive OR function on the one of three difference signals and the delayed difference signal.

8. The clock recovery apparatus of claim 7, wherein the delay circuit is configurable to provide a delay that accommodates variations in manufacturing process, circuit supply voltage, and die temperature (PVT) conditions.

9. The clock recovery apparatus of claim 8, wherein the transition pulse has a configurable duration.

10. A clock recovery method comprising:
generating a transition pulse in response to a transition in one of three difference signals representative of a difference in signaling state of a pair of wires in a three-wire bus, wherein transitions in one or more difference signals occur at boundaries between symbols that are sequentially transmitted over the three-wire bus;
providing a single pulse in a combination signal at each boundary between pairs of sequentially-transmitted symbols by combining one or more transition pulses generated at the each boundary between the pairs of sequentially-transmitted symbols;
clocking a delay flip flop with the combination signal such that signaling state of a clock signal is changed in response to each pulse in the combination signal; and
providing an inverse of the clock signal as an input to the delay flip flop.

11. The clock recovery method of claim 10, wherein providing the single pulse in the combination signal comprises:
providing a delayed difference signal by delaying one of three difference signals; and
performing an exclusive OR function on the one of three difference signals and the delayed difference signal to obtain the transition pulse.

12. The clock recovery method of claim 10, wherein the transition pulse has a configurable duration.

13. The clock recovery method of claim 10, further comprising:
using a rising edge in the clock signal to capture a first symbol from the three-wire bus; and
using a falling edge in the clock signal to capture a second symbol from the three-wire bus.

14. The clock recovery method of claim 10, wherein the symbols are sequentially transmitted over the three-wire bus in accordance with a C-PHY protocol.

15. A clock recovery method comprising:
generating a transition pulse in response to a transition in one of three difference signals representative of a difference in signaling state of a pair of wires in a three-wire bus, wherein transitions in one or more difference signals occur at boundaries between symbols that are sequentially transmitted over the three-wire bus;
providing a single pulse in a combination signal at each boundary between pairs of sequentially-transmitted symbols by combining one or more transition pulses generated at the each boundary between the pairs of sequentially-transmitted symbols;

clocking a delay flip flop with the combination signal such that signaling state of a clock signal is changed in response to each pulse in the combination signal; and
delaying the one of three difference signals by a duration that exceeds a duration of a skew between two of the three difference signals.

16. The clock recovery method of claim 15, further comprising:
delaying the one of three difference signals by a duration that accommodates variations in manufacturing process, circuit supply voltage, and die temperature (PVT) conditions.

17. A non-transitory processor-readable storage medium having one or more instructions which, when executed by at least one processor of a processing circuit in a receiver, cause the at least one processor to:
generate a transition pulse in response to a transition in one of three difference signals representative of a difference in signaling state of a pair of wires in a three-wire bus, wherein transitions in one or more difference signals occur at boundaries between symbols that are sequentially transmitted over the three-wire bus;
provide a single pulse in a combination signal at each boundary between pairs of sequentially-transmitted symbols by combining one or more transition pulses generated at the each boundary between the pairs of sequentially-transmitted symbols;
clock a delay flip flop with the combination signal such that signaling state of a clock signal is changed in response to each pulse in the combination signal; and
provide an inverse of the clock signal as an input to the delay flip flop.

18. The non-transitory storage medium of claim 17, further comprising instructions that cause the at least one processor to:
provide a delayed difference signal by delaying one of three difference signals; and
perform an exclusive OR function on the one of three difference signals and the delayed difference signal to obtain the transition pulse.

19. The non-transitory storage medium of claim 18, further comprising instructions that cause the at least one processor to:
delay the one of three difference signals by a duration that exceeds a duration of a skew between two of the three difference signals.

20. The non-transitory storage medium of claim 18, further comprising instructions that cause the at least one processor to:
delay the one of three difference signals by a duration that accommodates variations in manufacturing process, circuit supply voltage, and die temperature (PVT) conditions.

21. The non-transitory storage medium of claim 17, wherein the transition pulse has a configurable duration.

22. The non-transitory storage medium of claim 17, further comprising instructions that cause the at least one processor to:
provide an inverse of the clock signal as an input to the delay flip flop;
use a rising edge in the clock signal to capture a first symbol from the three-wire bus; and
use a falling edge in the clock signal to capture a second symbol from the three-wire bus.

23. A clock recovery apparatus comprising:
- means for generating a transition pulse in response to a transition in one of three difference signals representative of a difference in signaling state of a pair of wires in a three-wire bus, wherein transitions in one or more difference signals occur at boundaries between symbols that are sequentially transmitted over the three-wire bus;
- means for providing a single pulse in a combination signal at each boundary between pairs of sequentially-transmitted symbols by combining one or more transition pulses received from the means for generating the transition pulse;
- means for providing a clock signal that is output by the clock recovery apparatus, wherein the means for providing a clock signal includes a delay flipflop configured to respond to each pulse in the combination signal by changing signaling state of the clock signal; and
- means for capturing symbols from the three-wire bus, wherein the means for capturing symbols is configured to use a rising edge in the clock signal to capture a first symbol, and use a falling edge in the clock signal to capture a second symbol.

24. The clock recovery apparatus of claim 23, wherein the means for providing single pulse in the combination signal is configured to:
- provide a delayed difference signal by delaying one of three difference signals; and
- perform an exclusive OR function on the one of three difference signals and the delayed difference signal to obtain the transition pulse.

25. The clock recovery apparatus of claim 24, wherein the means for providing single pulse in the combination signal comprises:
- a delay circuit configured to delay the one of three difference signals by a duration that exceeds a duration of a skew between two of the three difference signals.

26. The clock recovery apparatus of claim 24, the means for providing single pulse in the combination signal is configured to accommodate variations in manufacturing process, circuit supply voltage, and die temperature (PVT) conditions.

27. The clock recovery apparatus of claim 23, wherein the transition pulse has a configurable duration.

* * * * *